US012613700B2

(12) United States Patent
Boemer et al.

(10) Patent No.: US 12,613,700 B2
(45) Date of Patent: Apr. 28, 2026

(54) ZERO EXTENDED 52-BIT INTEGER FUSED MULTIPLY ADD AND SUBTRACT INSTRUCTIONS

(71) Applicant: Intel Corporation, Santa Clara, CA (US)

(72) Inventors: Fabian Boemer, Santa Barbara, CA (US); Vinodh Gopal, Westborough, MA (US); Gelila Seifu, San Jose, CA (US); Sejun Kim, Hillsboro, OR (US); Jack Crawford, London (GB)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 17/514,549

(22) Filed: Oct. 29, 2021

(65) Prior Publication Data

US 2023/0136291 A1 May 4, 2023

(51) Int. Cl.
*G06F 9/30* (2018.01)
*G06F 7/523* (2006.01)
*G06F 7/544* (2006.01)

(52) U.S. Cl.
CPC .......... *G06F 9/30145* (2013.01); *G06F 7/523* (2013.01); *G06F 7/5443* (2013.01); *G06F 9/3001* (2013.01); *G06F 9/30036* (2013.01); *G06F 9/30038* (2023.08); *G06F 9/30101* (2013.01)

(58) Field of Classification Search
CPC .................................................. G06F 9/30145
See application file for complete search history.

(56) References Cited

U.S. PATENT DOCUMENTS

| | | | |
|---|---|---|---|
| 11,593,295 B2 * | 2/2023 | Fleming, Jr. ........ | G06F 9/30145 |
| 2006/0136540 A1 | 6/2006 | Tang et al. | |
| 2006/0277244 A1 * | 12/2006 | Renno ................. | G06F 7/49947 |
| | | | 708/552 |
| 2016/0041813 A1 | 2/2016 | Narayanamoorthy et al. | |
| 2019/0042235 A1 * | 2/2019 | Sade ..................... | G06F 9/3824 |
| 2019/0042242 A1 | 2/2019 | Das et al. | |
| 2019/0056916 A1 | 2/2019 | Varma et al. | |
| 2020/0026515 A1 * | 1/2020 | Valentine ............ | G06F 9/30105 |
| 2023/0205489 A1 | 6/2023 | Drane | |

FOREIGN PATENT DOCUMENTS

EP          4174643 A1      5/2023

OTHER PUBLICATIONS

Notification of CN Publication for CN202211126497.2, May 5, 2023, Pub. No. CN116069291A, 5 pages.
Examination Report (Comm Pursuant to Article 94(3)) for EP Application No. 22195999.2, Nov. 24, 2023, 8 pages.

(Continued)

*Primary Examiner* — Michael J Metzger
(74) *Attorney, Agent, or Firm* — Nicholson De Vos Webster & Elliott LLP

(57) ABSTRACT

A processor includes an instruction set architecture that having instructions to perform data parallel multiply on a set of 52-bit integers and further instructions that additionally perform an add or subtract on intermediate products of the data parallel multiply. A 52-bit result of the operations is then zero extended to 64-bits.

9 Claims, 25 Drawing Sheets

(56)  References Cited

OTHER PUBLICATIONS

Kostic Dusan et al: "Using the New VPMADD Instructions for the New Post Quantum Key Encapsulation Mechanism SIKE", 2019 IEEE 26th Symposium on Computer Arithmetic (Arith), IEEE, Jun. 10, 2019 (Jun. 10, 2019), pp. 215-218, XP033636229.
European Search Report and Search Opinion, EP App. No. 22195999.2, Feb. 15, 2023, 10 pages.
Office Action, EP App. No. 22195999.2, Nov. 24, 2023, 7 pages.
Peroni Daniel et al: "Runtime Efficiency-Accuracy Tradeoff Using Configurable Floating Point Multiplier", IEEE Transactions on Computer-Aided Design of Integrated Circuits and Systems, IEEE, USA, vol. 39, No. 2, Dec. 4, 2018 (Dec. 4, 2018), pp. 346-358.
Extended European Search Report for EP22195999, dated Feb. 15, 2023, 11 pages.

* cited by examiner

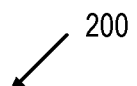
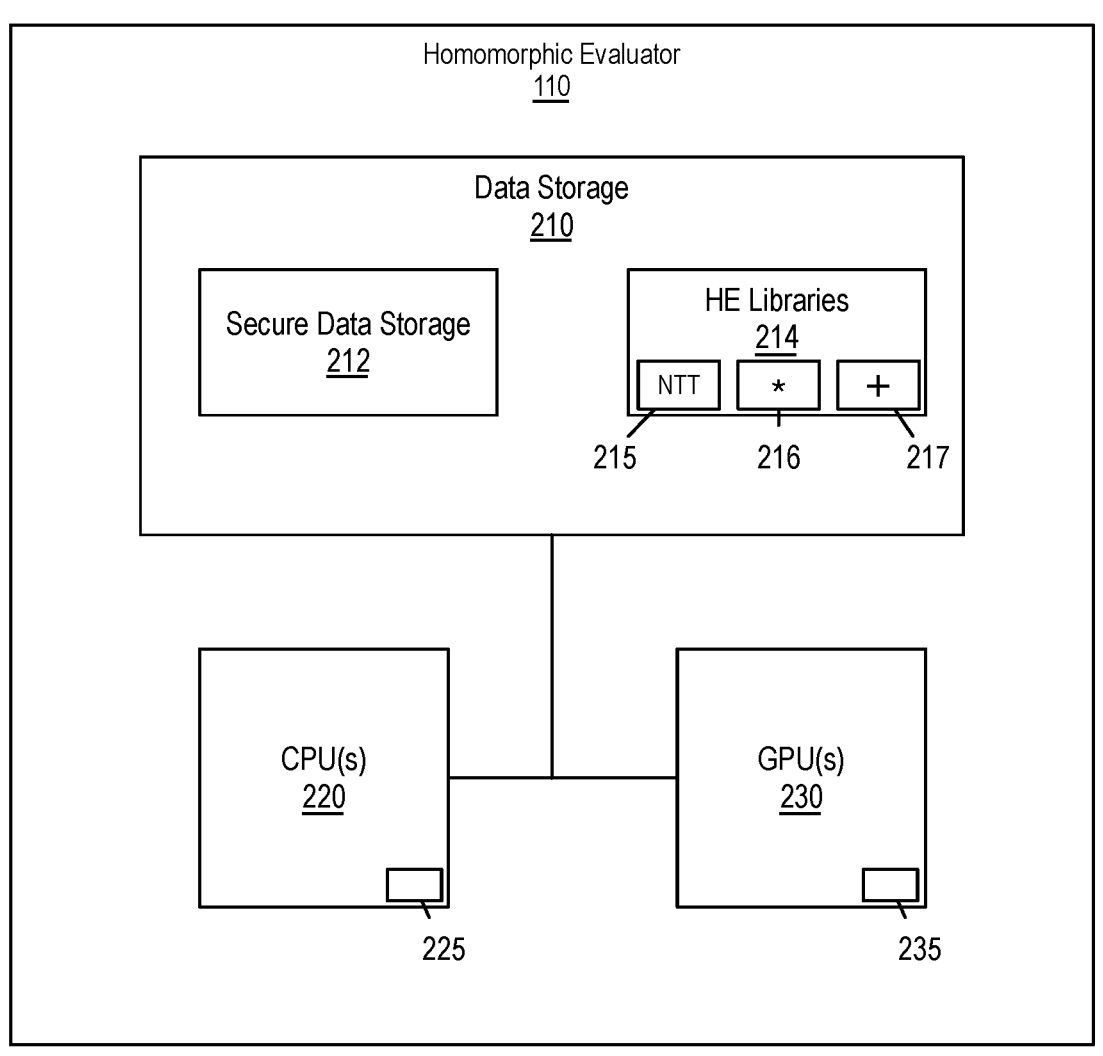
FIG. 2

300

| Opcode (vpm52huq) 302 | Destination (reg/mem) 304 | Source (reg/mem) 306 | Source (reg/mem) 308 |
|---|---|---|---|

310

| Opcode (vpm52luq) 302 | Destination (reg/mem) 304 | Source (reg/mem) 306 | Source (reg/mem) 308 |
|---|---|---|---|

320

| Opcode (vpmadd52huq52z) 302 | Destination (reg/mem) 304 | Source (reg/mem) 306 | Source (reg/mem) 308 | Source (reg/mem) 309 |
|---|---|---|---|---|

330

| Opcode (vpmadd52huq52) 302 | Destination (reg/mem) 304 | Source (reg/mem) 306 | Source (reg/mem) 308 | Source (reg/mem) 309 |
|---|---|---|---|---|

340

| Opcode (vpmsub52huq52z) 302 | Destination (reg/mem) 304 | Source (reg/mem) 306 | Source (reg/mem) 308 | Source (reg/mem) 309 |
|---|---|---|---|---|

350

| Opcode (vpmsub52huq52) 302 | Destination (reg/mem) 304 | Source (reg/mem) 306 | Source (reg/mem) 308 | Source (reg/mem) 309 |
|---|---|---|---|---|

Pipeline 1000

| PREFIX(ES) 1301 | OPCODE 1303 | ADDRESSING 1305 | DISPLACEMENT 1307 | IMMEDIATE 1309 |
|---|---|---|---|---|

SOC
INTEGRATED CIRCUIT
2100

ZERO EXTENDED 52-BIT INTEGER FUSED MULTIPLY ADD AND SUBTRACT INSTRUCTIONS

BACKGROUND

Privacy-preserving machine learning (PPML) is an upcoming trend which enables learning from data while keeping the data private. PPML techniques include the use of secure execution techniques, federated learning, secure multi-party computation, and homomorphic encryption (HE). HE is a form of encryption which enables computation on the encrypted data. However, HE schemes are computationally expensive. Accordingly, techniques to reduce the computational expense of HE are beneficial to PPML and other privacy preserving analysis techniques that enable computations to be performed on private data without exposing the underlying data to the computation device.

BRIEF DESCRIPTION OF THE DRAWINGS

The present invention is illustrated by way of example and not limitation in the figures of the accompanying drawings in which like references indicate similar elements, and in which:

FIG. 2 illustrates a homomorphic evaluator configured to perform hardware accelerated homomorphic encryption operations;

FIG. 3 illustrates a set of integer instructions to perform 52-bit multiply, multiply-add, and multiply-subtract operations, which can be used to accelerate number-theoretic transform operations;

DETAILED DESCRIPTION

Figure 1:
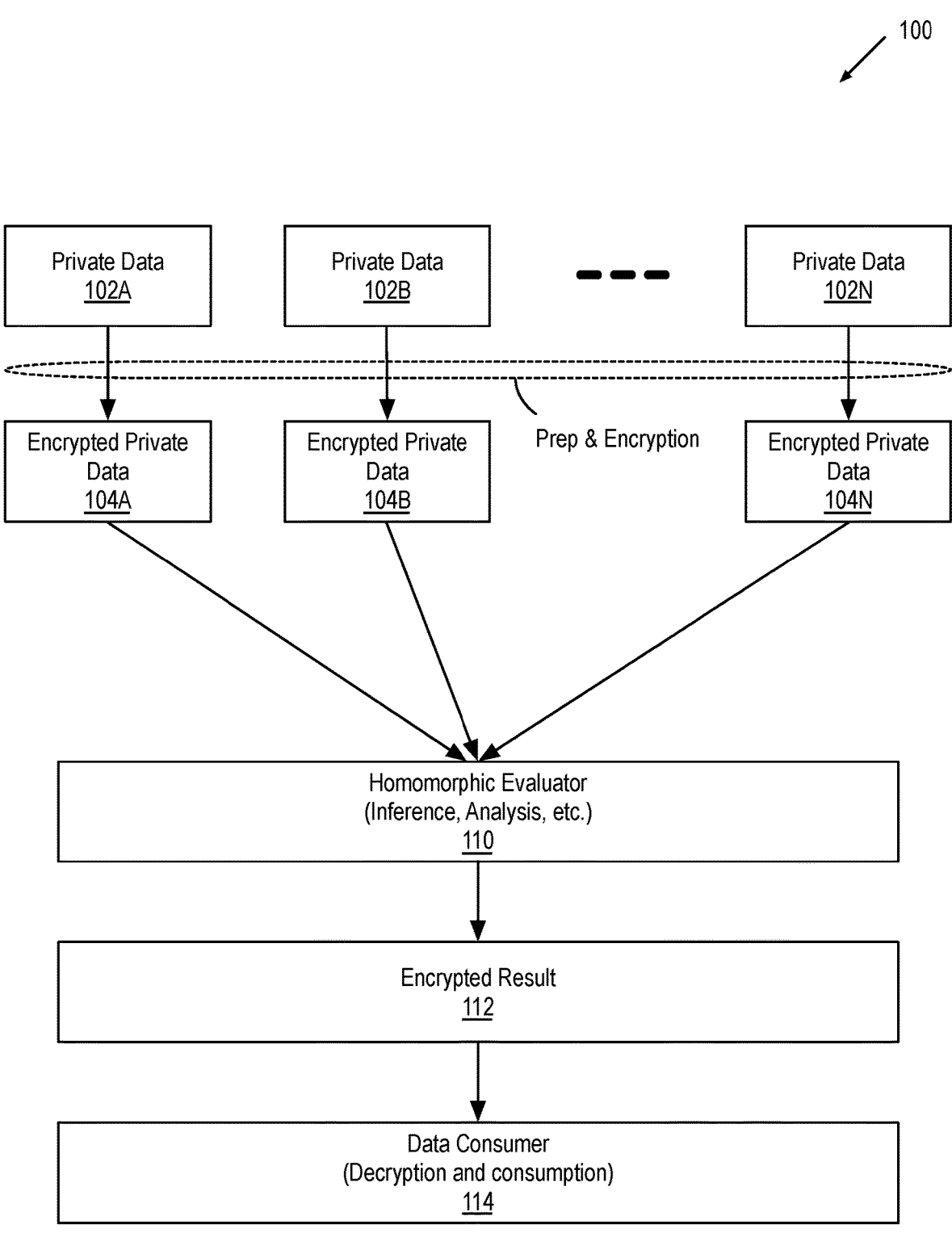
FIG. 1 illustrates a system that can be used to perform PPML via HE.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. The techniques and teachings described herein may be applied to a device, system, or apparatus including various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Polynomial multiplication in the finite field $$\frac{Z_q}{X^N + 1}$$

(polynomials degree at most N−1 whose coefficients are integers mod q), or similar fields, is a bottleneck in the cryptography workloads of many HE applications. The negacyclic number-theoretic transform (NTT), both the forward transform and the inverse transform, is a modification of the cyclic NTT that can be used to improve the acceleration of polynomial multiplication. Multiplying two polynomials f(x)*g(x) in this field is typically computed as InvNTT(FwdNTT(f) $\odot$ FwdNTT(g)), where $\odot$ indicates element-wise vector-vector modular multiplication. In particular, the NTT is used to speed up polynomial multiplication over a polynomial ring. The core of the NTT computation is modular integer arithmetic, in particular modular addition and multiplication. Notwithstanding numerous optimizations to NTT computation, NTT operations remain a critical performance bottleneck for HE applications.

The National Institute of Standards and Technology (NIST) Post-Quantum Cryptography Standardization Process has several finalists which utilize the NTT for efficient implementation, including three of the four encryption schemes proposed (Crystals-Kyber, NTRU, Saber). In particular, the NTT is used to speed up polynomial multiplication over a polynomial ring. Polynomial multiplication is a large bottleneck in these cryptography workloads. For example, polynomial multiplication can consume up to 60% of the runtime for the Saber encryption scheme.

The core of the NTT computation is modular integer arithmetic, in particular modular addition and multiplication. The NTT has been well studied, inheriting a rich theory from the floating-point equivalent—the Fast Fourier Transform (FFT)—and highly optimized, yet remains a bottleneck. As such, even incremental performance improvements are valuable.

Described herein is a new set of instructions to optimize the forward and inverse NTT operations. These instructions perform a packed multiply of 52-bit integers, and may also perform additional add, subtract, or store operations on the high or low 52-bit products. These instructions enable significant performance improvements in NTT and inverse NTT operation over the existing parallel integer fused multiply-add instructions.

FIG. 1 illustrates a system 100 that can be used to perform PPML via HE. The system 100 includes a homomorphic evaluator 110 that includes a processing system that provides hardware acceleration for HE. The system 100 enables private data 102A-102N to be processed without exposing the underlying data to the homomorphic evaluator 110. The private data 102A-102N represents any data that is protected from wide dissemination, such as personal, personally identifiable, financial, sensitive, or regulated information. The private data 102A-102N can be multiple elements of private data associated with a single client device or can represent different instances of the same element of private data that is provided by multiple client devices.

Client device(s) associated with the private data 102A-102N can prepare (e.g., format) the data and then encrypt the data into encrypted private data 104A-104N. The encrypted private data 104A-104N can then be provided to the homomorphic evaluator 110 for processing in a privacy preserving manner. The homomorphic evaluator 110 uses HE computations to perform inference, analysis, and other mathematical operations on encrypted data. HE operations performed by the homomorphic evaluator 110 produce an encrypted result 112 that is consistent with the result that would be produced if equivalent mathematical operations had been performed on unencrypted data. The encrypted result 112 can then be provided to a data consumer 114 for decryption and consumption. To enable encryption of the private data 102A-102N and the decryption of the encrypted result 112, the data consumer 114 can generate a public and private homomorphic key pair. The public key enables the encryption of the private data (e.g., by the one or more clients that possess the private data 102A-102N). The private key enables the data consumer 114 to decrypt an analysis result that is generated by the homomorphic evaluator 110 based on the encrypted data.

The performance and efficiency of the HE operations that are performed by the homomorphic evaluator 110 can be improved via the use of processing resources (e.g., central processing units (CPU), graphics processing units (GPUs), compute accelerators, Field Programmable Gate Arrays (FP- GAs), etc.) that provide support for an instruction set architecture (ISA) that includes instructions to accelerate the performance and/or efficiency of routinely performed HE operations. For example, the performance and efficiency of HE operations can be improved by providing instructions that enable common operations to be performed using a reduced number of instructions. Embodiments described herein provide processing resources that include support for instructions to accelerate HE operations.

FIG. 2 illustrates a system 200 that includes a homomorphic evaluator 110 that is configured to perform hardware accelerated homomorphic encryption operations. In one embodiment the homomorphic evaluator 110 includes data storage 210, one or more CPU(s) 220, and one or more GPU(s) 230. The homomorphic evaluator 110 can perform HE operations using instructions provided by the one or more CPU(s) 200 and/or one or more GPU(s) 230. The data storage 210 can include system memory that is used to facilitate program execution, which may be volatile or non-volatile memory, as well as non-volatile storage memory to facilitate persistent data storage. The various memory types and devices can have different physical address spaces while sharing a virtual memory address space. The data storage 210 can also encompass memory that is local to one or more of the GPU(s) 230, which can also be included in a unified virtual address space that is shared between the CPU(s) 220 and the GPU(s) 230.

The data storage 210 can include a region of secure data storage 212, which is used to store encrypted private data 104A-104N. Although the encrypted private data 104A-104N is encrypted, the secure data storage 212 can be further encrypted using additional encryption keys, such as, for example keys that are specific to the homomorphic evaluator 110, the service provider associated with the homomorphic evaluator 110, and/or keys that are specific to the clients that are managed by the encrypted private data 104A-104N. Data storage 210 can also include homomorphic encryption libraries (HE libraries 214). Exemplary HE libraries 214 include but are not limited to the SEAL, PALISADE, and HElib libraries, which enable the performance of homomorphic encryption operations on encrypted data. HE libraries 214 can also include the HEXL (homomorphic encryption acceleration) library, which includes functionality that can be used to accelerate the performance of the SEAL, PALISADE, and HElib libraries. The HEXL Library provides efficient implementations of integer arithmetic on Galois fields, which are prevalent and frequently performed operations in encryption generally and homomorphic encryption in particular.

While specific exemplary libraries are described, embodiments described herein provide instructions that may be used by, and are not specific to, any particular software that is executable by the processing resources described herein. For example, HE libraries 214, and any other program code, can use instructions provided herein to accelerate number-theoretic transform operations (NTT operations 215), element-wise modular multiplication operations 216, and polynomial modular addition operations 217. Acceleration is performed via hardware logic 225 within the CPU(s) 220 and/or hardware logic 235 within the GPU(s), where the hardware logic 225 of the CPU(s) 220 and the hardware logic 235 of the GPU(s) 230 are implemented in the respective processors via circuitry that includes configurable hardware logic and/or fixed-functionality hardware logic.

The NTT associated with NTT operations 215 is equivalent to the fast Fourier transform (FFT) in a finite (Galois) field, such that all addition and multiplications are performed with respect to the modulus q. As noted above, multiplying two polynomials f(x)*g(x) in this field is typically computed as InvNTT(FwdNTT(f) $\odot$ FwdNTT(g)), where $\odot$ indicates element-wise vector-vector modular multiplication. The NTT-based formulation reduces the runtime of polynomial-polynomial modular multiplication from $O(N^2)$ to $O(N \log N)$.

The forward NTT can be implemented using the Cooley-Tukey radix-2 transform shown in Table 1, where $$a = (a_0, a_1, \ldots, a_{N-1}) \in \mathbb{Z}_q^N$$

in standard ordering, N is a power of 2, q is a prime satisfying $q \equiv 1 \bmod 2N$, and $$\psi_{rev} \in \mathbb{Z}_q^N$$

stores the powers of $\psi$ in bit-reversed order.

TABLE 1

| Cooley-Tukey Radix-2 NTT |
| --- |
| 1: function COOLEY-TUKEY RADIX-2 NTT(a, N, q, $\psi_{rev}$) |
| 2:    t ← n |
| 3:    for (m = 1; m < n; m = 2n) do |
| 4:      t ← t/2 |
| 5:      for (i = 0; i < m; i++) do |
| 6:        $j_1$ ← 2 · j · t |
| 7:        $j_2$ ← $j_1$ + t − 1 |
| 8:        W ← $\psi_{rev}$ [m + i] |
| 9:        for (j = $j_1$; j ≤ $j_2$; j++) do |
| 10:          $X_0$ ← $a_j$ |
| 11:          $X_1$ ← $a_{j+t}$ |
| 12:          $a_j$ ← $X_0$ + W · $X_1$ mod q |
| 13:          $a_{j+t}$ ← $X_0$ − W · $X_1$ mod q |
| 14:        end for |
| 15:      end for |
| 16:    end for |
| 17:    return a |
| 18: end function |

The "butterfly" operation in lines 9-14 of the Cooley-Tukey Radix-2 NTT are key instructions, with lines 10-13 making up the bulk of the computations. The addition and multiplication operations are modular addition and modular multiplication, which are additions and multiplications in the finite field $Z_q$. Optimizations to the butterfly operation are also possible, for example using the Harvey NTT butterfly, which delays modular reduction for improved performance. For the Harvey NTT shown in Table 2, $\beta=2^{64}$ is the typical word size for 64-bit processors.

TABLE 2

| Harvey NTT Butterfly |
| --- |
| 1: function HARVEYNTTBUTTERFLY $(X_0, X_1, W, W', q, \beta)$ |
| 2:    if $X_0$ ≥ 2q then |
| 3:      $X_0$ ← $X_0$ − 2q |
| 4:    end if |
| 5:    Q ← $\lfloor W'X_1/\beta \rfloor$ |
| 6:    T ← (W$X_1$ − Qq) mod $\beta$ |
| 7:    $Y_0$ ← $X_0$ + T |
| 8:    $Y_1$ ← $X_0$ − T + 2q |

TABLE 2-continued

| Harvey NTT Butterfly |
| --- |
| 9:    return $Y_0$, $Y_1$ |
| 10: end function |

Using the Harvey butterfly in the Cooley-Tukey NTT yields outputs in $$\mathbb{Z}_{4q}^N,$$

so the final pass through the forward NTT computation can reduce the output to [0, q) if desired.

An exemplary inverse NTT operation in the form of the Gentleman-Sande inverse NTT process is shown in Table 3.

TABLE 3

| Gentleman-Sande Radix-2 Inverse NTT |
| --- |
| 1: function GENTLEMAN-SANDE RADIX-2 INVNTT(a, N, q, $\psi_{rev}$) |
| 2:    t ← 1 |
| 3:    for (m = n; m > 1; m = m/2) do |
| 4:      $j_1$ ← 0 |
| 5:      h ← m/2 |
| 6:      for (i = 0; i < h; i++) do |
| 7:        $j_2$ ← $j_1$ + t − 1 |
| 8:        W ← $\psi_{rev}^{-1}$[h + i] |
| 9:        for (j = $j_1$; j ≤ $j_2$; j++) do |
| 10:          $X_0$ ← $a_j$ |
| 11:          $X_1$ ← $a_{j+t}$ |
| 12:          $a_j$ ← $X_0$ + $X_1$ mod q |
| 13:          $a_{j+t}$ ← ($X_0$ − $X_1$) · W mod q |
| 14:        end for |
| 15:        $j_1$ ← $j_1$ + 2t |
| 16:      end for |
| 17:      t ← 2t |
| 18:    end for |
| 19:    for (j = 0; j < n; j++) do |
| 20:      a[j] ← a[j] · $n^{-1}$ mod q |
| 21:    end for |
| 22:    return a |
| 23: end function |

The butterfly operation of lines 10-13 represent the bulk of the computation, where the addition and multiplication are in the finite field $Z_q$. Where the Harvey NTT Butterfly optimization is used, the Harvey inverse NTT Butterfly of Table 4 may be used for the inverse NTT.

TABLE 4

| Harvey inverse NTT Butterfly |
| --- |
| 1: function HARVEYINVNTTBUTTERFLY $(X_0, X_1, W, W', q, \beta)$ |
| 2:    $Y_0$ ← $X_0$ + $X_1$ |
| 3:    if $Y_0$ ≥ 2q then |
| 4:      $Y_0$ ← $Y_0$ − 2q |
| 5:    end if |
| 6:    T ← $X_0$ − $X_1$ + 2q |
| 7:    Q ← $\lfloor W'T/\beta \rfloor$ |
| 8:    $Y_1$ ← (WT − Qq) mod $\beta$ |
| 9:    return $Y_0$, $Y_0$ |
| 10: end function |

The Harvey butterfly for inverse NTT shown in Table 4 relays modular reduction for improved performance. As with the forward transform, when using the Harvey butterfly, the final pass through the NTT computation should reduce the output to [0, q) if desired.

As the NTT operations described above are used in HE computations, improving the performance of the above operations can improve the performance of HE implementations.

Packed 52-Bit Integer Arithmetic

Cryptographic processes can make use of 52-bit integer operations to perform arithmetic on large integer values that have been split into multiple limbs of 52-bits. The use of 52-bit arithmetic provides additional overflow bits for the limbs of the large integer and allows the arithmetic on each of the limbs to be performed in parallel instead of sequentially. The vpmadd52huq and vpmadd52luq instructions are provided by the Intel® AVX512IFMA instruction set. The instructions receive packed 512-bit values (a, b, c), each of which include eight 64-bit elements, each having an unsigned 52-bit integer value. The instructions multiply the packed unsigned 52-bit integers in each of 64-bit element b and c to form a 104-bit intermediate result. The instructions then add the high 52-bit unsigned integer (vpmadd52huq) or low 52-bit unsigned integer (vpmadd52huq) from the intermediate result with the corresponding unsigned 64-bit integer in a, then stores the results in a specified destination (dst) location. The instructions provided by embodiments ments described herein include 52-bit multiply instructions 300, 310 (vpm52huq, vpm52luq), 52-bit multiply-add instructions 320, 330 (vpmadd52huq52z, vpmadd52huq52), and 52-bit multiply-subtract instructions 340, 350 (vpmsub52huq52z, vpmsub52huq52). In one embodiment, the instructions are in a format that includes an opcode 302 that identifies the instruction, as well as a destination operand 304 (dst), a first source operand 306 (src1), and a second source operand 308 (src2). The 52-bit multiply-add instructions 320, 330 and the 52-bit multiply-subtract instructions 340, 350 additionally include a third source operand 309 (src3). In one embodiment, the instructions can be specified as an in-place operation in which the destination operand 304 is determined based on the first source operand 306. Operand data can be stored in 128-bit (xmm) registers, 256-bit (ymm) registers, or 512-bit (zmm) registers. Operands may also be read from or written to memory addresses storing 128-bit, 256-bit, or 512-bit packed data, with each input element being a 52-bit integer value that is stored in a 64-bit data element. While instructions using 128-bit, 256-bit, and 512-bit registers or packed memory locations are shown, embodiments are not limited to those specific widths.

Examples of 52-bit multiply instruction 300 (vpm52huq) are shown in Table 6.

TABLE 6

| Vector Packed 52-bit Integer Multiply Instructions (High-52) |
| --- |
| 1: vpm52huq xmm1, xmm2 / ml 28 (src1, src2 / dst) (2 sources, 1 destination) |
| 2: vpm52huq ymm1, ymm2 / m256 (src1, src2 / dst) (2 sources, 1 destination) |
| 3: vpm52huq zmm1, zmm2 / m512 (src1, src2 / dst) (2 sources, 1 destination) | described herein provide extended functionality over the existing vpmadd52huq and vpmadd52luq instructions and enable NTT and inverse NTT implementations having improved performance.

FIG. 3 illustrates a set of integer instructions to perform 52-bit multiply, multiply-add, and multiply-subtract operations, which can be used to accelerate NTT operations. The set of instructions are also shown in Table 5 below.

TABLE 5

| Vector Packed 52-bit Integer Operations | |
| --- | --- |
| Instruction | Operation Shorthand |
| vpm52huq | dst = ZeroExtend64(hi52(lo52(b) * lo52(c)) |
| vpm52luq | dst = ZeroExtend64(lo52(lo52(b) * lo52(c)) |
| vpmadd52huq52z | dst = ZeroExtend64(lo52(hi52(lo52(b) * lo52(c)) + a)) |
| vpmadd52huq52 | dst = ZeroExtend64(hi52(lo52(b) * lo52(c)) + lo52(a)) |
| vpmsub52huq52z | dst = ZeroExtend64(lo52(hi52(lo52(b) * lo52(c)) – a)) |
| vpmsub52huq52 | dst = ZeroExtend64(hi52(lo52(b) * lo52(c)) – lo52(a)) |

The instructions of FIG. 3 and Table 5 perform 52-bit integer operations with a zero extend to 64 bits before output to the destination. The instructions provided by embodi- 52-bit multiply instruction 300 (vpm52huq) omits the addition operation performed by the existing vpmadd52huq instruction. The 52-bit multiply instruction 300 causes a functional unit of a processor to perform the operations shown in Table 7.

TABLE 7

| Vector Packed 52-bit Integer Multiply Operations (High-52) |
| --- |
| 1: FOR j := 0 to (NBitLanes-1) |
| 2:     i := j*64 |
| 3:     tmp[127:0] := ZeroExtend64(src1[i+51:i]) * ZeroExtend64(src2[i+51:i]) |
| 4:     dst[i+63:0] = ZeroExtend64(tmp[103:52]) |
| 5: ENDFOR |

The vpm52huq instruction causes a functional unit of a processor to multiply packed unsigned 52-bit integers in each 64-bit element of src1 and src2 to form a 104-bit intermediate result. The instruction then causes the functional unit to store the high 52 bits of the result in the destination.

Examples of 52-bit multiply instruction 310 (vpm52luq) are shown in Table 8.

TABLE 8

| Vector Packed 52-bit Integer Multiply Instructions (Low-52) |
| --- |
| 1: vpm52luq xmm1, xmm2 / m128 (src1, src2 / dst) (2 sources, 1 destination) |
| 2: vpm52luq ymm1, ymm2 / m256 (src1, src2 / dst) (2 sources, 1 destination) |
| 3: vpm52luq zmm1, zmm2 / m512 (src1, src2 / dst) (2 sources, 1 destination) |

The vpm52luq instruction omits the addition operation performed by the vpmadd52luq instruction and causes a functional unit of a processor to perform the operations shown in Table 9.

TABLE 9

| Vector Packed 52-bit Integer Multiply Operations (Low-52) |
| --- |
| 1: FOR j := 0 to (NBitLanes-1) |
| 2:    i := j*64 |
| 3:    tmp[127:0] := ZeroExtend64(src1[i+51:i]) * ZeroExtend64(src2[i+51:i]) |
| 4:    dst[i+63:0] = ZeroExtend64(tmp[51:0]) |
| 5: ENDFOR |

The vpm52luq instruction causes a functional unit of a processor to multiply packed unsigned 52-bit integers in each 64-bit element of src1 and src2 to form a 104-bit intermediate result. The instruction then causes the functional unit to store the low 52 bits of the result in the destination.

Examples of 52-bit multiply-add instruction 320 are shown in Table 10.

TABLE 10

| Vector Packed 52-bit Integer Multiply-Add Instructions |
| --- |
| 1: vpmadd52huq52z xmm1, xmm2, xmm3 / m128 (src1, src2, src3 / dst) (3 sources, 1 destination) |
| 2: vpmadd52huq52z ymm1, ymm2, ymm3 / m256 (src1, src2, src3 / dst) (3 sources, 1 destination) |
| 3: vpmadd52huq52z zmm1, zmm2, zmm3 / m512 (src1, src2, src3 / dst) (3 sources, 1 destination) |

The vpmadd52huq52z instruction causes a functional unit of a processor to perform the operations shown in Table 11.

TABLE 11

| Vector Packed 52-bit Integer Multiply-Add Operations |
| --- |
| 1: FOR j := 0 to (NBitLanes-1) |
| 2:    i := j*64 |
| 3:    tmp[127:0] := ZeroExtend64(src2[i+51:i]) * ZeroExtend64(src3[i+51:i]) |
| 4    tmp[63:0]: = src1[i+63:i] + ZeroExtend64(tmp[103:52]) |
| 5:    dst[i+63:0] = ZeroExtend64(tmp[51:0]) |
| 6: ENDFOR |

The vpmadd52huq52z instruction causes a functional unit of a processor to multiply packed unsigned 52-bit integers in each 64-bit element of the src2 and src3 inputs to form a 104-bit intermediate result. The functional unit then adds the high 52-bit unsigned integer from the intermediate result with the corresponding unsigned 64-bit integer in the src1 input, discarding the possible overflow bit. The functional unit then stores the low 52 bits of the result in the destination and stores 0 in the high 12 bits of the destination.

Examples of 52-bit multiply-add instruction 330 are shown in Table 12.

TABLE 12

| Alternate Vector Packed 52-bit Integer Multiply-Add Instructions |
| --- |
| 1: vpmadd52huq52 xmm1, xmm2, xmm3 / m128 (src1, src2, src3 / dst) (3 sources, 1 destination) |
| 2: vpmadd52huq52 ymm1, ymm2, ymm3 / m256 (src1, src2, src3 / dst) (3 sources, 1 destination) |
| 3: vpmadd52huq52 zmm1, zmm2, zmm3 / m512 (src1, src2, src3 / dst) (3 sources, 1 destination) |

The vpmadd52huq52 instruction differs from vpmadd52huq52z by clearing the high 12 bits of the summand in src1, rather than the destination. The vpmadd52huq52 instruction causes a functional unit of a processor to perform the operations shown in Table 13.

TABLE 13

| Alternate Vector Packed 52-bit Integer Multiply-Add Operations |
| --- |
| 1: FOR j := 0 to (NBitLanes-1) |
| 2:    i := j*64 |
| 3:    tmp[127:0] := ZeroExtend64(src2[i+51:i]) * ZeroExtend64(src3[i+51:i]) |
| 4    tmp[52:0]: = src1[i+51:i] + tmp[103:52] |
| 5:    dst[i+63:0] = ZeroExtend64(tmp[52:0]) |
| 6: ENDFOR |

The vpmadd52huq52 instruction causes a functional unit of a processor to multiply packed unsigned 52-bit integers in each 64-bit element of the src2 and src3 inputs to form a 104-bit intermediate result. The functional unit then adds the high 52-bit unsigned integer from the intermediate result with the corresponding unsigned 52-bit integer in the src1 input and stores the result, including the overflow bit, in the destination.

Examples of 52-bit multiply-subtract instruction 340 are shown in Table 14.

TABLE 14

| Vector Packed 52-bit Integer Multiply-Subtract Instructions |
| --- |
| 1: vpmsub52huq52z xmm1, xmm2, xmm3 / m128 (src1, src2, src3 / dst) (3 sources, 1 destination) |
| 2: vpmsub52huq52z ymm1, ymm2, ymm3 / m256 (src1, src2, src3 / dst) (3 sources, 1 destination) |
| 3: vpmsub52huq52z zmm1, zmm2, zmm3 / m512 (src1, src2, src3 / dst) (3 sources, 1 destination) |

The vpmsub52huq52z instruction causes a functional unit of a processor to perform the operations shown in Table 15.

TABLE 15

| Vector Packed 52-bit Integer Multiply-Subtract Operations |
| --- |
| 1: FOR j := 0 to (NBitLanes-1) |
| 2:    i := j*64 |
| 3:    tmp[127:0] := ZeroExtend64(src2[i+51:i]) * ZeroExtend64(src3[i+51:i]) |
| 4    tmp[63:0]: = ZeroExtend64(tmp[103:52]) − src1[i+63:i] |
| 5:    dst[i+63:0] = ZeroExtend64(tmp[51:0]) |
| 6: ENDFOR |

The vpmsub52huq52z instruction causes a functional unit of a processor to multiply packed unsigned 52-bit integers in each 64-bit element of the src2 and src3 inputs to form a 104-bit intermediate result. The functional unit then subtracts the high 52-bit unsigned integer from the intermediate result by the corresponding unsigned 64-bit integer in src1 and stores the low 52 bits of the result in the destination, discarding extra possible bits due to underflow. The functional unit then stores 0 in the high 12 bits of the destination.

Examples of 52-bit multiply-subtract instruction 350 are shown in Table 16.

TABLE 16

| Alternate Vector Packed 52-bit<br>Integer Multiply-Subtract Instructions |
| --- |
| 1: vpmadd52huq52 xmm1, xmm2, xmm3 / m128<br>(src1, src2, src3 / dst) (3 sources, 1 destination)<br>2: vpmadd52huq52 ymm1, ymm2, ymm3 / m256<br>(src1, src2, src3 / dst) (3 sources, 1 destination)<br>3: vpmadd52huq52 zmm1, zmm2, zmm3 / m512<br>(src1, src2, src3 / dst) (3 sources, 1 destination) |

The vpmsub52huq52 instruction differs from vpmsub52huq52z by clearing the high 12 bits of the subtrahend in src1, rather than the destination, and differs from vpmadd52huq52 by performing a subtraction instead of an addition. The vpmsub52huq52 instruction causes a functional unit of a processor to perform the operations shown in Table 17.

TABLE 17

| Alternate Vector Packed<br>52-bit Integer Multiply-Subtract Operations |
| --- |
| 1: FOR j := 0 to (NBitLanes-1)<br>2:   i := j*64<br>3:   tmp[127:0] := ZeroExtend64(src2[i+51:i])<br>      * ZeroExtend64(src3[i+51:i])<br>4   tmp[51:0]: = tmp[103:52] − src1[i+51:i]<br>5:   dst[i+63:0] = ZeroExtend64(tmp[51:0])<br>6: ENDFOR |

The vpmadd52huq52 instruction causes a functional unit of a processor to multiply packed unsigned 52-bit integers in each 64-bit element of the src2 and src3 inputs to form a 104-bit intermediate result. The functional unit then subtracts the high 52-bit unsigned integer from the intermediate result by the corresponding unsigned 52-bit integer in src1, discarding extra possible bits due to underflow, and stores the low 52 bits of the intermediate result in the destination.

As discussed above, a multiplication optionally followed by addition or subtraction instruction can be embodied in several forms, including a 128-bit, 256-bit, and 512-bit form, with each operand including two, four, or eight 64-bit data elements that store a 52-bit data value. In other embodiments, instructions are provided in which one, two, or three of the input operands are a single 64-bit integer, which is useful in the case when all of the data elements store the same value, which may be the case when the operand stores a modulus value. Additionally, one embodiment provides a set of instructions that operate on signed integers, which may be useful in cases where elements of $Z_q=\{$integers mod q$\}$ are represented using the range [−q/2, q/2). For comparison, the unsigned integer instantiation may be useful when $Z_q$ is represented using the range [0, q). A further embodiment provides instructions that set overflow or underflow flag. For example, instruction 320 (vpmadd52huq52z) can set an overflow flag if an overflow is detected during addition. Instruction 340 (vpmsub52huq52z) and instruction 350 (vpmsub52huq52) can set an underflow bit if an underflow is detected during subtraction. In one embodiment, instruction 320, instruction 340, and instruction 350 can output a mask to indicate the index of the data element/ channel/lane that over or underflowed. For example, instruction 320 can be modified as shown in Table 18.

TABLE 18

| Masked Vector Packed 52-bit<br>Integer Multiply-Add Mask Instruction |
| --- |
| vpmadd52huq52z_mask zmm1, zmm2, zmm3 /<br>{z}m512 (src1, src2, src3 / dst) (3 sources, 2 destinations) |

The exemplary masked instruction causes a functional unit of a processor to multiply packed unsigned 52-bit integers in each 64-bit element of the src2 and src3 input to form a 104-bit intermediate result. The functional unit then adds the high 52-bit unsigned integer from the intermediate result with the corresponding unsigned 64-bit integer in the src1 input. In case of overflow in 64-bit integer at index i, the functional unit will set bit i in the destination mask. The functional unit then stores the low 52 bits of the result in the destination and stores 0 in the high 12 bits of the destination. Instruction 340 and instruction 350 can be modified in a similar manner for underflows.

Figure 4:
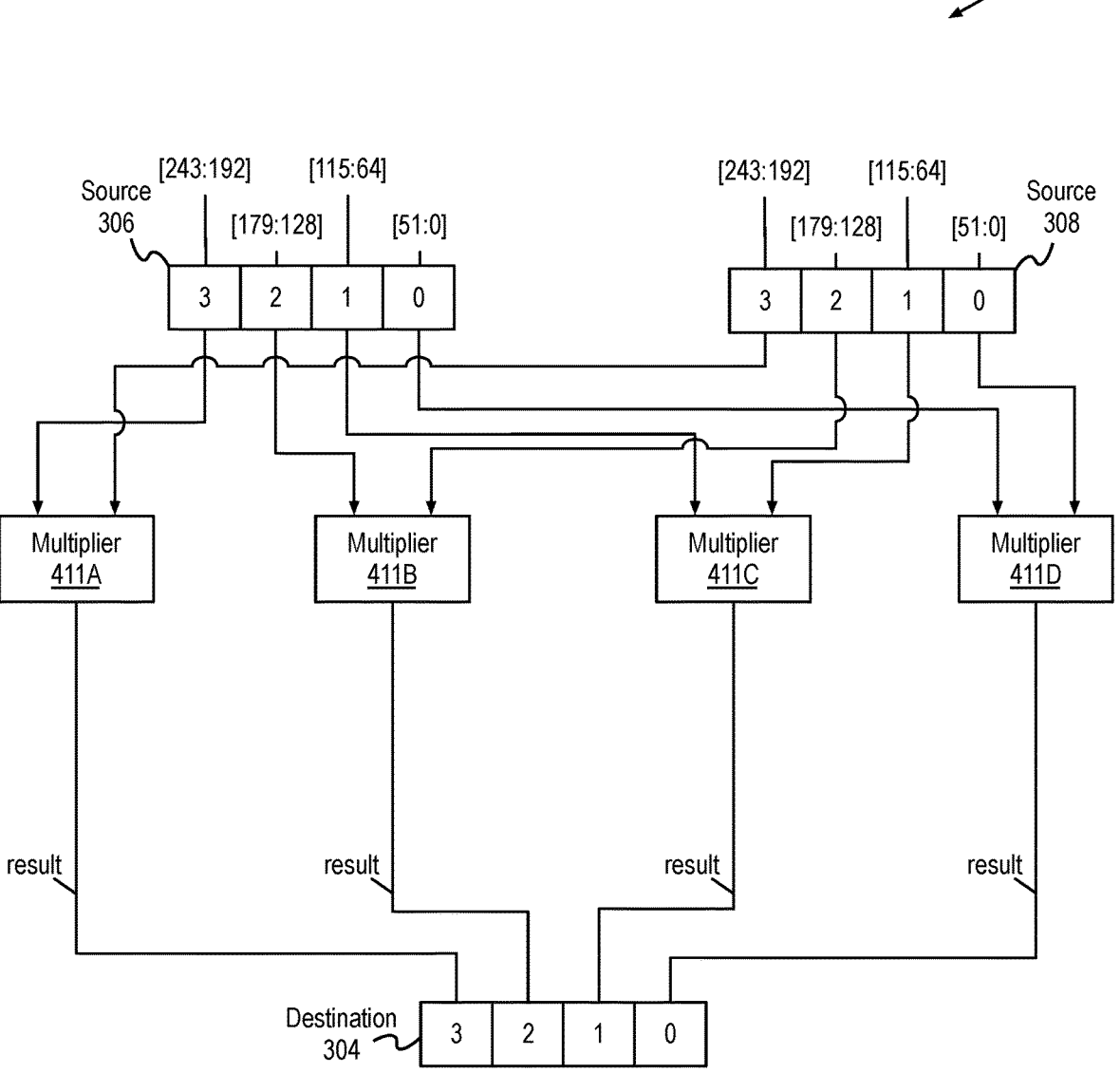
FIG. 4 illustrates circuitry to execute a vector packed 52-bit multiply instruction, according to an embodiment.

FIG. 4 illustrates circuitry 400 to execute a vector packed 52-bit multiply instruction, according to an embodiment. Circuitry 400 is configurable to execute 52-bit multiply instruction 300 (vpm52huq) and execute 52-bit multiply instruction 310 (vpm52luq) described above. Circuitry 400, illustrated in block diagram form, includes a set of multipliers 411A-411B that are configured to multiply packed unsigned 52-bit integers in each 64-bit element of the first source operand 306 (src1) and second source operand 308 (src2) to form a 104-bit intermediate result. Circuitry 400 is illustrated as performing a 256-bit operation on four-element packed data inputs. The number of data elements that are processed can vary depending on the width of the operation. For example, a 512-bit operation on 64-bit data elements will operate on eight-element packed data inputs.

The circuitry can then store the high 52 bits or low 52 bits of the intermediate result to the destination specified by the destination operand 304. In one embodiment, the 52-bit data elements are provided within zero-extended 64-bit data elements of the first source operand 306 and the second source operand 308, with the multipliers 411A-411D configured to perform a 64-bit×64-bit multiply to generate a 128-bit value that includes the 104-bit intermediate product of the 52-bit multiply. The multipliers 411A-411D are configurable to output a 64-bit result that includes a 64-bit zero extended value based on the high 52-bits of the 104-bit intermediate result ([103:52]) that is stored in the 128-bit value that is output by the multipliers 411A-411D. The multipliers 411A-411D are also configurable to output a result 64-bit result that includes a 64-bit zero extended value based on the lower 52-bits of the 104-bit intermediate result ([51:0]) that is stored in the 128-bit value that is output by the multipliers. The 64-bit values that are output by each of the multipliers 411A-411D is stored to the destination specified by the destination operand 304.

In one embodiment, the multipliers 411A-411D are configured to perform a direct 52-bit×52-bit multiply to generate the 104-bit intermediate product. In such embodiment, the multipliers 411A-411D can reside in floating-point units that are configurable to perform double precision floating point operations, as the double prevision floating point format includes a 52-bit mantissa and a 52-bit×52-bit multiply operation is performed during double precision floating-point multiplication.

Figure 5A:
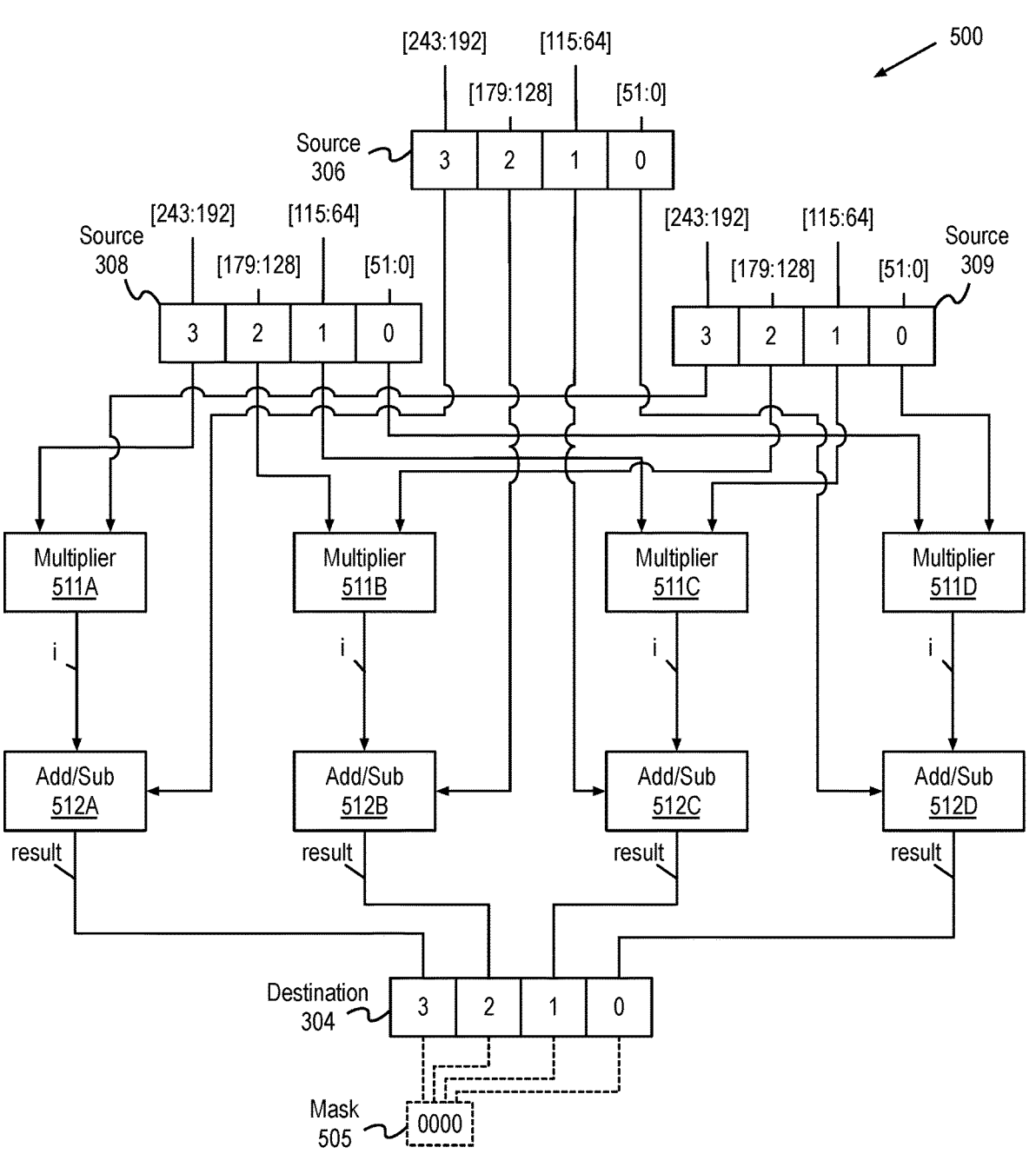
FIG. 5A-5B illustrates circuitry to perform a vector packed 52-bit multiply-add or multiply-subtract instruction, according to an embodiment.
Figure 5B:
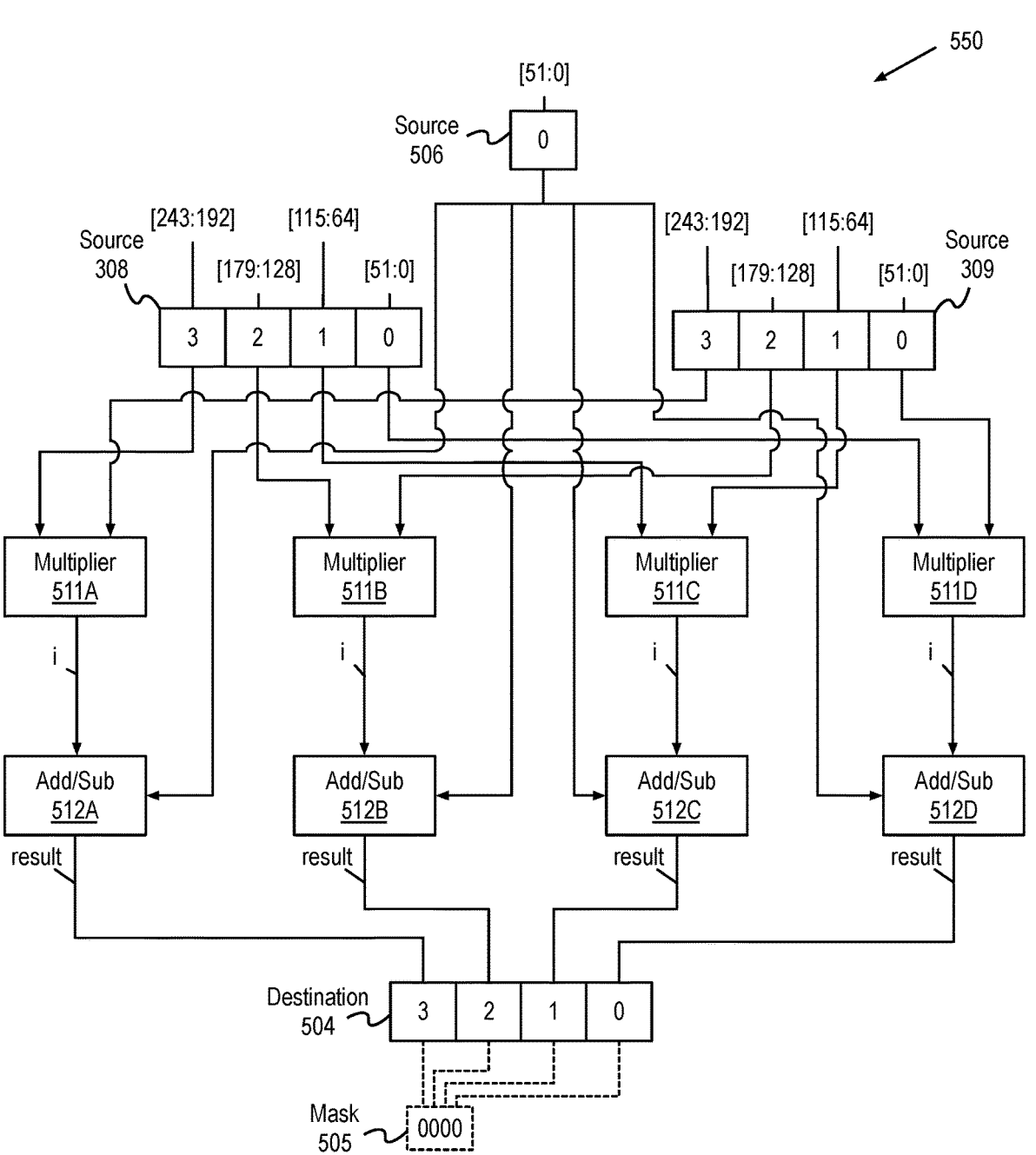

FIG. 5A-5B illustrates circuitry 500, 550 to perform a vector packed 52-bit multiply-add or multiply-subtract instruction, according to an embodiment. Circuitry 500, illustrated in block diagram form in FIG. 5A, includes a set of multipliers 511A-511D and adder/subtractor circuits 512A-512D. Circuitry 500 is configurable to execute the 52-bit multiply-add instruction 320 (vpmadd52huq52z), 52-bit multiply-add instruction 330 (vpmadd52huq52), 52-bit multiply-subtract instruction 340 (vpmsub52huq52z), and 52-bit multiply-subtract instruction 350 (vpmsub52huq52) described above.

In one embodiment, input data values are provided within 64-bit data elements of the first source operand 306 (src1), second source operand 308 (src2), and third source operand 309 (src3). For each multiply-add or multiply subtract instruction, the multipliers 511A-511D configured to perform a 64-bit×64-bit multiply operation on corresponding data elements from the second source operand 308 and third source operand 309 to generate a 128-bit value that includes the 104-bit intermediate result of the 52-bit multiply. The multipliers 511A-511D can then output a 128-bit intermediate result to the adder/subtractor circuits 512A-512D, which can perform different operations depending on the opcode of the instruction.

In one embodiment, the multipliers 511A-511D are configured to perform a direct 52-bit×52-bit multiply to generate the 104-bit intermediate product. In such embodiment, the multipliers 511A-511D can reside in floating-point units that are configurable to perform double precision floating point operations, as the double prevision floating point format includes a 52-bit mantissa and a 52-bit×52-bit multiply operation is performed during double precision floating-point multiplication. For the vpmadd52huq52z instruction, the adder/subtractor circuits 512A-512D add the zero extended high 52-bits of the 104-bit intermediate result to 64-bit values received from the first source operand 306 to generate 64-bit intermediate results, zero extends the lower 52 bits of the 64-bit intermediate results to generate an output result, then outputs the output result to the destination specified by the destination operand 304. The add operation performed by the adder/subtractor circuits 512A-512D discards a possible overflow bit. In one embodiment, if the overflow bit was discarded, a bit is set in a mask 505 that is output for mask-enabled versions of the function.

For the vpmadd52huq52 instruction, the high 12 bits of the summands in the first source operand 306 are cleared instead of in the destination. The adder/subtractor circuits 512A-512D add the high 52-bits of the 104-bit intermediate result to 52-bit values received from the first source operand 306 to generate 53-bit intermediate results, which each include a 52-bit intermediate value and an overflow bit. The 53-bit intermediate values are then zero extended to 64 bits and stored to the destination specified by the destination operand 304. As the output is based on a zero extended 53-bit value, a mask/overflow variant may be excluded in some embodiments.

For the vpmsub52huq52z instruction, the adder/subtractor circuits 512A-512D subtract 64-bit values received from the first source operand 306 from the zero extended high 52-bits of the 104-bit intermediate result to generate 64-bit intermediate results, zero extends the lower 52 bits of the 64-bit intermediate results to generate an output result, then outputs the output result to the destination specified by the destination operand 304. The subtract operation performed by the adder/subtractor circuits 512A-512D discards extra possible bits due to an underflow (e.g., wraparound). In one embodiment, if an underflow occurred for a given lane or channel of execution, a corresponding bit is set in a mask 505 that is output for mask-enabled versions of the function.

For the vpmsub52huq52 instruction, the high 12 bits of the subtrahend in the first source operand 306 are cleared instead of in the destination. The adder/subtractor circuits 512A-512D subtract 52-bit values received from the first source operand 306 from the high 52-bits of the 104-bit intermediate result to generate 52-bit intermediate results. The 52-bit intermediate value is then zero extended to 64 bits and stored to the destination specified by the destination operand 304. The subtract operation performed by the adder/subtractor circuits 512A-512D discards extra possible bits due to an underflow (e.g., wraparound). In one embodiment, if an underflow occurred for a given lane or channel of execution, a corresponding bit is set in a mask 505 that is output for mask-enabled versions of the function.

Circuitry 550, illustrated in block form in FIG. 5B, is similar to circuitry 500, excepting that a single 52-bit value is provided as the first source operand 506. In the illustrated embodiment, the 52-bit value is the summand for a multiply-add operation or the subtrahend of a multiply-subtract operation. The 52-bit first source operand 506 value can be broadcast to all lanes or channels of the vector packed parallel operation. In various alternate embodiments, the second source operand 308 or the third source operand 309 may be single data element values that are broadcast to all lanes or channels of the circuitry.

Multiple instances of circuitry 400, 500, and 550 described above may be found within an arithmetic logic unit (ALU) of a CPU or GPU depending on the number of physical SIMD lanes that are supported. Additionally, the circuitry may be used in the SIMD back-end of a GPU having support for a single instruction multiple thread (SIMT) execution model.

Figure 6:
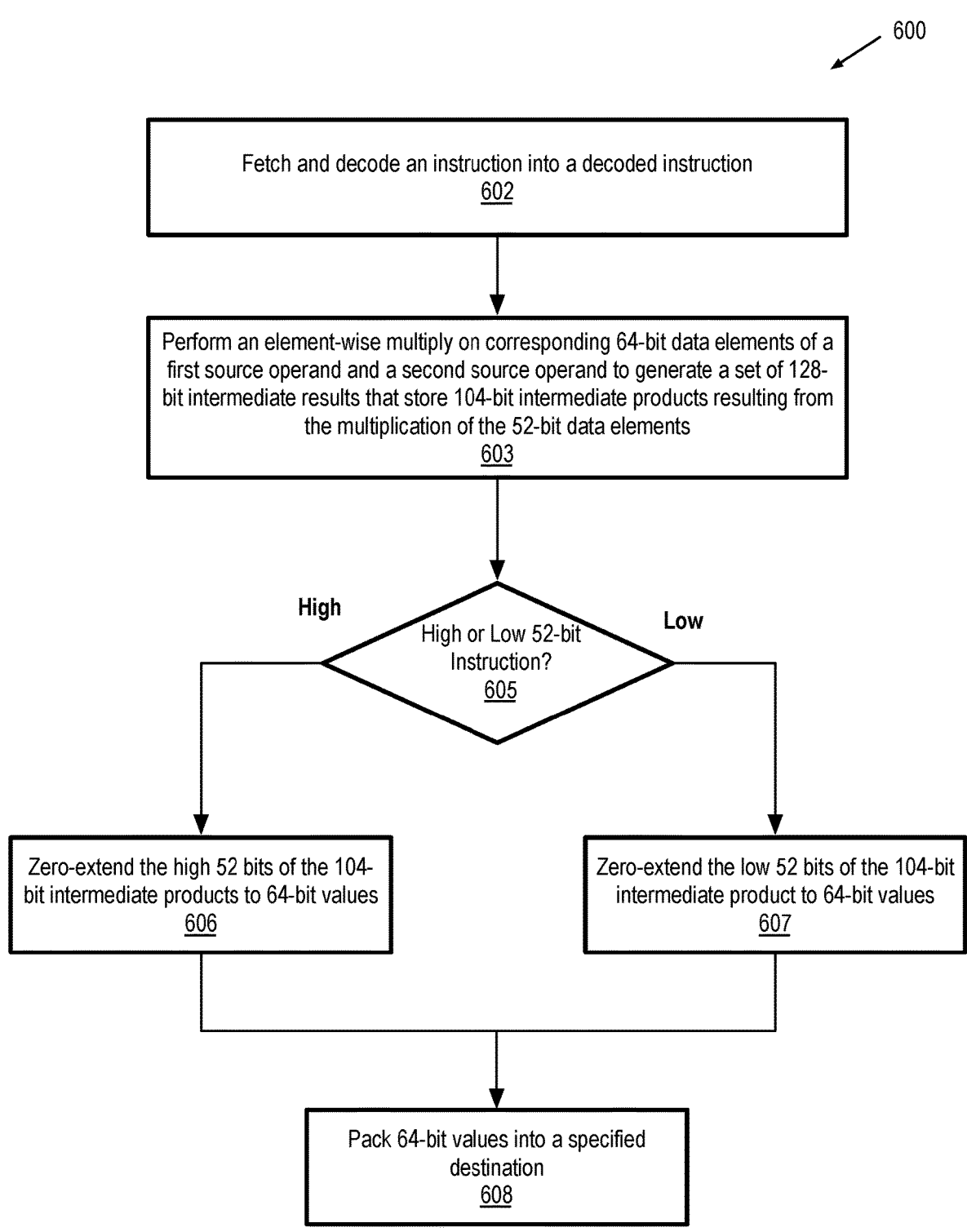
FIG. 6 illustrates a method to execute a 52-bit vector packed multiply instruction, according to embodiments described herein.

FIG. 6 illustrates a method 600 to execute a 52-bit vector packed multiply instruction, according to embodiments described herein. The method 600 can be executed by functional units of a processor, which can include a general-purpose processor (CPU), graphics processor (GPU), or a general-purpose graphics processor (GPGPU) that is configured to accelerate graphics and compute operations.

According to method 600, the processor can fetch and instruction and decode the instruction into a decoded instruction, as shown at block 602. The instruction can be, for example, instruction 300 or instruction 310 of FIG. 3 and include first and second source operands, which may include 64-bit data elements that are packed into a 128-bit, 256-bit, or 512-bit vector or packed data type in a memory location. The processor can configure multipliers in a functional unit to perform an element-wise multiply on corresponding 64-bit data elements of a first source operand and a second source operand to generate a set of 128-bit intermediate results that store 104-bit intermediate products resulting from the multiplication of the 52-bit data elements, as shown at block 603. Alternatively, a set of 52-bit×52-bit multiply operations can be performed by floating-point hardware to generate a 104-bit intermediate result.

Method 600 additionally includes for the processor to determine whether the instruction is to operate on the high 52-bits or the low 52-bits of the 104-bit intermediate products, as shown at block 605. To execute instruction 300 (vpm52huq), the processor is configured to operate on the high 52-bits of the 104-bit intermediate products. The processor can zero-extend the high 52 bits of the 104-bit intermediate products to produce 64-bit values, as shown at block 606. To execute instruction 310 (vpm52luq), the processor is configured to operate on the low 52-bits of the 104-bit intermediate products. The processor can zero-extend the low 52 bits of the 104-bit intermediate products to produce 64-bit values, as shown at block 607. For both instructions, the processor then packs the 64-bit values that are output by the multipliers into the specified destination, as shown at block 608. The destination can be, for example, a 128-bit, 256-bit, or 512-bit vector register. The multiply operations can be performed concurrently across multiple execution channels, with the number of channels determined based on the execution size or instruction width of the instruction (e.g., two, four, or eight channels for 128-bit, 256-bit, or 512-bit operands).

Figure 7:
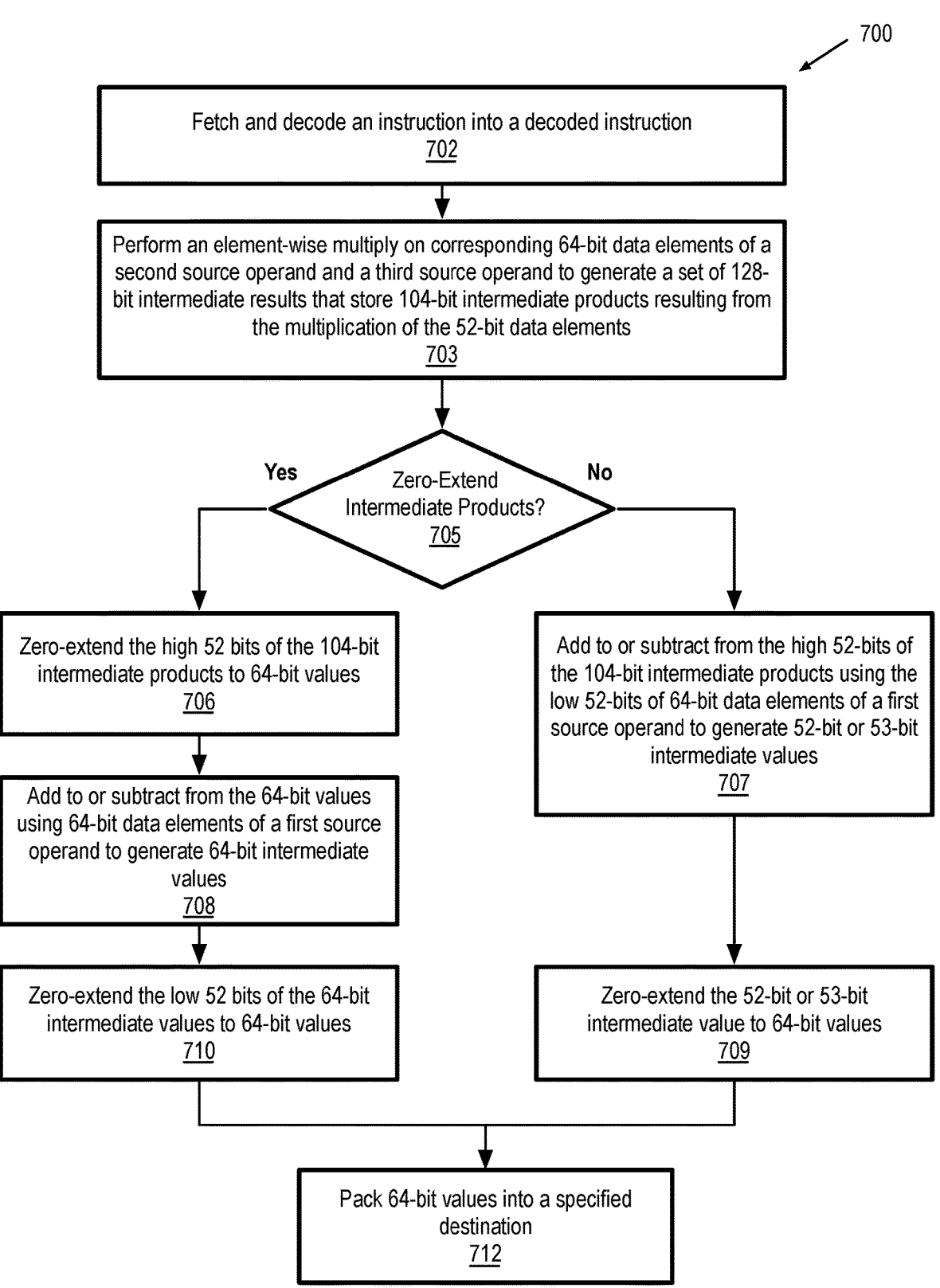
FIG. 7 illustrates a method to execute a 52-bit vector packed multiply-add or multiply-subtract instructions, according to embodiments described herein.

FIG. 7 illustrates a method 700 to execute a 52-bit vector packed multiply-add or multiply-subtract instructions, according to embodiments described herein. The method 700 can be executed by functional units of a processor, which can include a general-purpose processor (CPU), graphics processor (GPU), or a general-purpose graphics processor (GPGPU) that is configured to accelerate graphics and compute operations.

According to method 700, the processor can fetch and instruction and decode the instruction into a decoded instruction, as shown at block 702. The instruction can be, for example, instruction 320, instruction 330, instruction 340, or instruction 350 of FIG. 3 and include first, second, and third source operands, which may include 64-bit data elements that are packed into a 128-bit, 256-bit, or 512-bit vector or packed data type in a memory location. One or more of the operands can also be a single 64-bit data element that is broadcast to all execution lanes or channels. The processor can configure multipliers in a functional unit to perform an element-wise multiply on corresponding 64-bit data elements of a second source operand and a third source operand to generate a set of 128-bit intermediate results that store 104-bit intermediate products resulting from the multiplication of the 52-bit data elements, as shown at block 703. Alternatively, a set of 52-bit×52-bit multiply operations can be performed by floating-point hardware to generate a 104-bit intermediate result.

Method 700 additionally includes for the processor to determine whether execution of the instruction includes to zero-extend the intermediate products, as shown at block 705. Instruction 320 (vpmadd52huq52z) and instruction 340 (vpmsub52huq52z) cause the intermediate products to be zero extended before the addition or subtraction operations are performed. Instruction 330 (vpmadd52huq52) and instruction 350 (vpmsub52huq52) do not zero extend the intermediate products. For vpmadd52huq52z and vpmsub52huq52z, the processor can configure a functional unit to zero-extend the high 52 bits of the 104-bit intermediate products to 64-bit values, as shown at block 706. The functional unit then can add to or subtract from the 64-bit values using 64-bit data elements of a first source operand to generate 64-bit intermediate values, as shown at block 708. The functional unit can then zero-extend the low 52 bits of the 64-bit intermediate values to 64-bit values, as shown at block 710. For vpmadd52huq52 and vpmsub52huq52, the processor can configure a functional unit to add to or subtract from the high 52-bits of the 104-bit intermediate products using the low 52-bits of 64-bit data elements of a first source operand to generate 52-bit (vpmsub52huq52) or 53-bit (vpmadd52huq52) intermediate values, as shown at block 707. The functional unit can then zero-extend the low 52-bit or 53-bit intermediate value to 64-bit values, as shown at block 709. For each instruction, to return the resulting values the functional unit can pack the 64-bit values into a specified destination as shown at block 712. The destination can be, for example, a 128-bit, 256-bit, or 512-bit vector register. The multiply operations can be performed concurrently across multiple execution channels, with the number of channels determined based on the execution size or instruction width of the instruction (e.g., two, four, or eight channels for 128-bit, 256-bit, or 512-bit operands). An overflow is included in the output for vpmadd52huq52. For vpmadd52huq52z, vpmsub52huq52, and vpmsub52huq52z, an overflow flag or a bitmask that identifies per-channel overflow can also be provided as output.

The instructions described herein can be used to reduce the number of instructions of used in some HE operations, as indicated by the exemplary forward NTT butterfly operations shown in Table 19 and Table 20 and the exemplary inverse NTT butterfly operations shown in Table 22 and Table 23.

TABLE 19

| Forward NTT Butterfly |
| --- |
| 01: inline void FwdButterfly (\_\_m512i* X, \_\_m512i* Y, \_\_m512i W_op, \_\_m512i W_precon, \_\_m512i neg_modulus, \_\_m512i twice_modulus) { |
| 02:    \_\_m512i zero = \_\_mm512_set1_epi64(0); |
| 03:    \_\_m512i tmp = \_\_mm512_sub_epi64(*X, twice_modulus); |
| 04:    *X = \_mm512_min_epu64(tmp, *X); |
| **05:    \_\_m512i Q = \_mm512_madd52hi_epu64 (zero, W_precon, *Y) ;** |
| **06:    \_\_m512i W_Y = \_mm512_madd52lo_epu64 (zero, W_op, *Y) ;** |
| 07:    \_\_m512i T = \_mm512_madd52lo_epu64 (W_Y, Q, neg_modulus) ; |
| 08:    // Discard high 12 bits; deals with case when |
| 09:    // W*Y < Q*p in the low 52 bits. |
| 10:    \_mm512i two_pow_52_min_1 = \_mm512_set1_epi64 ( (1ULL << 52) - 1) ; |
| 11    T = \_mm512_and_epi64 (T, two_pow_52_min_1) ; |
| 12:    m512i twice_mod_minus_T = \_mm512_sub_epi64(twice_modulus, T) ; |
| 13:    *Y = \_mm512_add_epi64(*X, twice_mod_minus_T) ; |
| 14:    *X = \_mm512_add_epi64(*X, T) ; |
| 15: } |

TABLE 20

| Forward NTT Butterfly with New 52-bit Instructions |
| --- |

```
01: inline void FwdButterfly (__m512i* X, __m512i* Y, __m512i W_op, __m512i
    W_precon, __m512i neg_modulus, __m512i twice_modulus, __m512i modulus) {
02:     __m512i tmp = _mm512_sub_epi64(*X, twice_modulus) ;
03:     *X = _mm512_min_epu64(trap, *X);
04:     __m512i Q = _mm512_m52hi_epu64 (W_precon, *Y) ;
05:     __m512i W_Y = _mm512_m52lo_epu64 (W_op, *Y) ;
06:     __m512i T = _mm512_madd52lo52z_epu64 (W_Y, Q, neg_modulus) ;
07:     // Alternatively, __m512i T = _mm512_msub52lo52z_epu64 (W_Y, Q,
    modulus) ;
08:     // Alternatively, __m512i T = _mm512_msub52lo52z_epu64 (W_Y, Q,
    modulus) ;
09:     __m512i twice_mod_minus_T = _mm512_sub_epi64 (twice_modulus, T) ;
10:     *Y = _mm512_add_epi64(*X, twice_mod_minus_T) ;
11:     *X = _mm512_add_epi64(*X, T) ;
12: }
```

The forward NTT butterfly routines shown in Table 19 and Table 20 are implemented using intrinsic instructions that map directly to associated assembly instructions. For the routines shown in Table 19, the instructions of lines 06-08 multiply packed unsigned 52-bit integers and add the high or low 52-bit unsigned integers from the intermediate result with an additional corresponding unsigned 64-bit integer input value. Line 06 and line 07 provide zero value inputs, as a 52-bit packed vector multiply instruction was not previously provided. A negative modulus value is provided to the instruction on line 08, as a 52-bit packed vector multiply-subtract instruction was not previously provided. Additional operations are performed on line 12 and 13 to discard the high 12 bits of the packed 64-bit data elements.

The efficiency of the forward NTT butterfly routine of Table 19 can be significantly improved using the instructions described herein, where the intrinsic instructions correspond with the instructions described herein according to Table 21.

TABLE 21

| Intrinsic Instruction Correspondence | |
| --- | --- |
| Intrinsic Instruction | Assembly Instruction |
| _mm512_m52hi_epu64 | vpm52huq |
| _mm512_m52lo_epu64 | vpm52huq |

TABLE 21-continued

| Intrinsic Instruction Correspondence | |
| --- | --- |
| Intrinsic Instruction | Assembly Instruction |
| _mm512_madd52lo52z_epu64 | vpmadd52huq52z |
| _mm512_madd52lo52_epu64 | vpmadd52huq52 |
| _mm512_msub52lo52z_epu64 | vpmsub52huq52z |
| _mm512_msub52lo52_epu64 | vpmsub52huq52 |

Using the 52-bit multiply and multiply-add or multiply-subtract instructions described herein, the number of assembly instructions used to execute a forward NTT operation in an example implementation can be reduced from eleven instructions to eight instructions and yields a significant performance improvement. The 52-bit multiply-add instructions with a zero input for the summand can be replaced with 52-bit multiply instructions. Operations to explicitly discard the high 12 bits are no longer required. An implementation is also enabled that makes use of multiply-subtract operations for modular arithmetic instead of a multiply-add operation using a negative modulus. Similar improvement can also be realized for the inverse NTT butterfly routine.

TABLE 22

| Inverse NTT Butterfly |
| --- |

```
01: inline void InvButterfly (__m512i* X, __m512i* Y, __m512i W_op, __m512i
    W_precon, __m512i neg_modulus, __m512i twice_modulus) {
02:     __m512i Y_minus_2q = _mm512_sub_epi64(*Y, twice_modulus) ;
03:     __m512i T = _mm512_sub_epi64(*X, Y_minus_2q) ;
04:     *X = _mm512_add_epi64(*X, Y_minus_2q) ;
05:     __mmask8 sign_bits = _mm512_movepi64_mask(*X) ;
06:     *X = _mm512_mask_add_epi64(*X, sign_bits, *X, twice_modulus) ;
07:     __m512i zero = _mm512_set1_epi64(0) ;
08:     __m512i Q = _mm512_madd52hi_epu64 (zero, W_precon, T) ;
09:     __m512i Q_p = _mm512_madd52lo_epu64 (zero, Q, neg_modulus) ;
10:     *Y = _mm512_madd52lo_epu64 (Q_p, W_op, T) ;
11      __m512i two_pow_52_min_1 = _mm512_set1_epi64 ( (1ULL << 52) - 1) ;
12:     *Y = _mm512_and_epi64 (*Y, two_pow_52_min_1) ;
13: }
```

TABLE 23

| Inverse NTT Butterfly with New 52-bit Instructions |
|---|

```
01:  inline void InvButterfly (__m512i* X, __m512i* Y, __m512i W_op, __m512i
        W_precon, __m512i neg_modulus, __m512i twice_modulus, __m512i modulus) {
02:       __m512i Y_minus_2q = _mm512_sub_epi64(*Y, twice_modulus);
03:       __m512i T = _mm512_sub_epi64(*X, Y_minus_2q) ;
04:       *X = _mm512_add_epi64(*X, Y_minus_2q);
05:       __mmask8 sign_bits = _mm512_movepi64_mask(*X) ;
06:       *X = _mm512_mask_add_epi64(*X, sign_bits, *X, twice_modulus) ;
07:       __m512i Q = _mm512_m52hi_epu64 (W_precon, T) ;
08:       __m512i Q_p = _mm512_m52lo_epu64 (Q, neg_modulus) ;
09:       // Alternatively, __m512i Q_p_pos = _mm512_m52lo_epu64 (Q, modulus) ;
10:       *Y = _mm512_madd521o52_epu64(Q_p, W_op, T) ;
11:       // Alternatively, *Y = _mm512_msub52lo52z_epu64(Q_p_pos, W_op, T) ;
12:       // Alternatively, *Y = _mm512_msub52lo52_epu64(Q_p_pos, W_op, T) ;
13:  }
```

Using the 52-bit multiply and multiply-add or multiply-subtract instructions described herein, the number of assembly instructions used to execute an inverse NTT operation in an example implementation can be reduced from eleven instructions to eight instructions and yields a significant performance improvement. The instructions on line 08 through line 12 of Table 22 can be replaced with one or more reduced instruction implementations shown on line 07 through line 12 of Table 23, which can include an implementation that performs a 52-bit multiply-add operation with a negative modulus input or a 52-bit multiply-subtract implementation.

The above embodiments provide a processor comprising first circuitry to decode an instruction into a decoded instruction, the instruction to indicate a first source operand and a second source operand. The processor additionally includes second circuitry including a processing resource to execute the decoded instruction. Responsive to the decoded instruction, the processing resource can perform an element-wise multiply on corresponding 64-bit data elements of a first source operand and a second source operand to generate a set of 128-bit intermediate results that store 104-bit intermediate products resulting from the multiplication of the 52-bit data elements. The processing resource can then zero-extend the high 52 bits of the 104-bit intermediate products to 64-bit values for a decoded instruction having a first opcode and zero-extend the low 52 bits of the 104-bit intermediate product to 64-bit values for a decoded instruction having a second opcode. The second circuitry can then pack the 64-bit values into packed data type and store the packed data type at a specified destination location.

One embodiment provides a processor comprising first circuitry to decode an instruction into a decoded instruction, the instruction to indicate a first source operand, a second source operand, a third source operand and a destination operand and second circuitry including a processing resource to execute the decoded instruction. Responsive to the decoded instruction, the processing resource is configured to perform an element-wise multiply on 52-bit data values in corresponding 64-bit data elements of the second source operand and the third source operand to generate a set of intermediate results that store 104-bit intermediate products resulting from the element-wise multiply performed on the 52-bit data values and, for a decoded instruction having a first opcode, zero-extend the high 52 bits of the 104-bit intermediate products to first 64-bit values, perform an arithmetic operation on the first 64-bit values and second 64-bit data values within 64-bit data elements of the first source operand, zero-extend the low 52 bits of the second 64-bit data values to generate third 64-bit data values, and pack the third 64-bit data values into packed data type and store the packed data type at a specified destination location.

In a further embodiment, the arithmetic operation is a subtraction operation and the first opcode is associated with a 52-bit multiply-subtract instruction. The arithmetic operation may also be an addition operation, with the first opcode being associated with a 52-bit multiply-add instruction. The second circuitry can be further configured to, for a decoded instruction having a second opcode, perform an arithmetic operation on the high 52-bits of the 104-bit intermediate products and the low 52-bits of the 64-bit data elements of the first source operand to generate intermediate values. The intermediate values can be 52-bit or 53-bit intermediate values. The second circuitry can then zero-extend the intermediate values to generate fourth 64-bit data values and pack the fourth 64-bit data values into the packed data type and store the packed data type at the specified destination location. Where the intermediate values are 53-bit intermediate values, the 53-bit intermediate values include a 52-bit intermediate value and an overflow bit, the arithmetic operation is an addition operation, and the second opcode is associated with a 52-bit multiply-add instruction. Where the intermediate values are 52-bit intermediate values, the second circuitry can set a bit in a mask in response to a determination that the intermediate value exceeds 52-bits, and the arithmetic operation can be a subtraction operation, with the second opcode being associated with a 52-bit multiply-subtract instruction, or the arithmetic operation is an addition operation, with the second opcode being associated with a 52-bit multiply-add instruction. The processor can be a general-purpose processing unit (e.g., CPU) or a general-purpose graphics processing unit (GPGPU).

A further embodiment provides a method comprising fetching and decoding an instruction into a decoded instruction, the instruction having multiple source operands and one or more destination operands. The method additionally includes executing the decoded instruction, where executing the decoded instruction includes performing an element-wise multiply on 52-bit data values in corresponding 64-bit data elements of two of the multiple source operands to generate a set of intermediate results that store 104-bit intermediate products resulting from the multiplication of the 52-bit data values, zero-extending the high 52 bits of the 104-bit intermediate products to generate 64-bit result values for a decoded instruction having a first opcode, zero-extending the low 52 bits of the 104-bit intermediate product to generate the 64-bit result values for a decoded instruction having a second opcode, and packing the 64-bit result values into packed data type and store the packed data type at a location specified by a destination operand.

Executing the decoded instruction can additionally include, for a decoded instruction having a third opcode, zero-extending the high 52 bits of the 104-bit intermediate products to generate first 64-bit intermediate values, adding to or subtracting from the first 64-bit intermediate values using 64-bit data elements of an additional source operand of the multiple source operands to generate second 64-bit intermediate values and zero-extending the low 52-bits of the 64-bit intermediate values to the 64-bit result values before packing the 64-bit result values into the packed data type. Executing the decoded instruction can also include, for a decoded instruction having a fourth opcode, adding to or subtracting from the high 52-bit values of the 104-bit intermediate products and the low 52-bits of the 64-bit data elements of an additional source operand of the multiple source operands to generate intermediate values that are either 52-bits or 53-bits, and zero-extending the intermediate values to generate the 64-bit result values before packing the 64-bit result values into the packed data type.

One embodiment provides a data processing system comprising a network interface, a memory device storing instructions, and one or more processors coupled with the network interface and the memory device. The one or more processors include a general-purpose processor (e.g., CPU) and/or a general-purpose graphics processor (GPGPU). The instructions to provide a homomorphic encryption acceleration library include primitives to accelerate homomorphic encryption operations. The one or more processors, responsive to execution of the instructions, are configured to receive a set of encrypted data via the network interface, wherein the set of encrypted data is encrypted via a homomorphic encryption scheme and perform an arithmetic operation on the set of encrypted data via a primitive provided by the homomorphic encryption acceleration library.

Other processors, devices, and/or systems may also be provided based on the details above and the architectural details provided below.

CPU and GPU System Architecture

Figure 8:
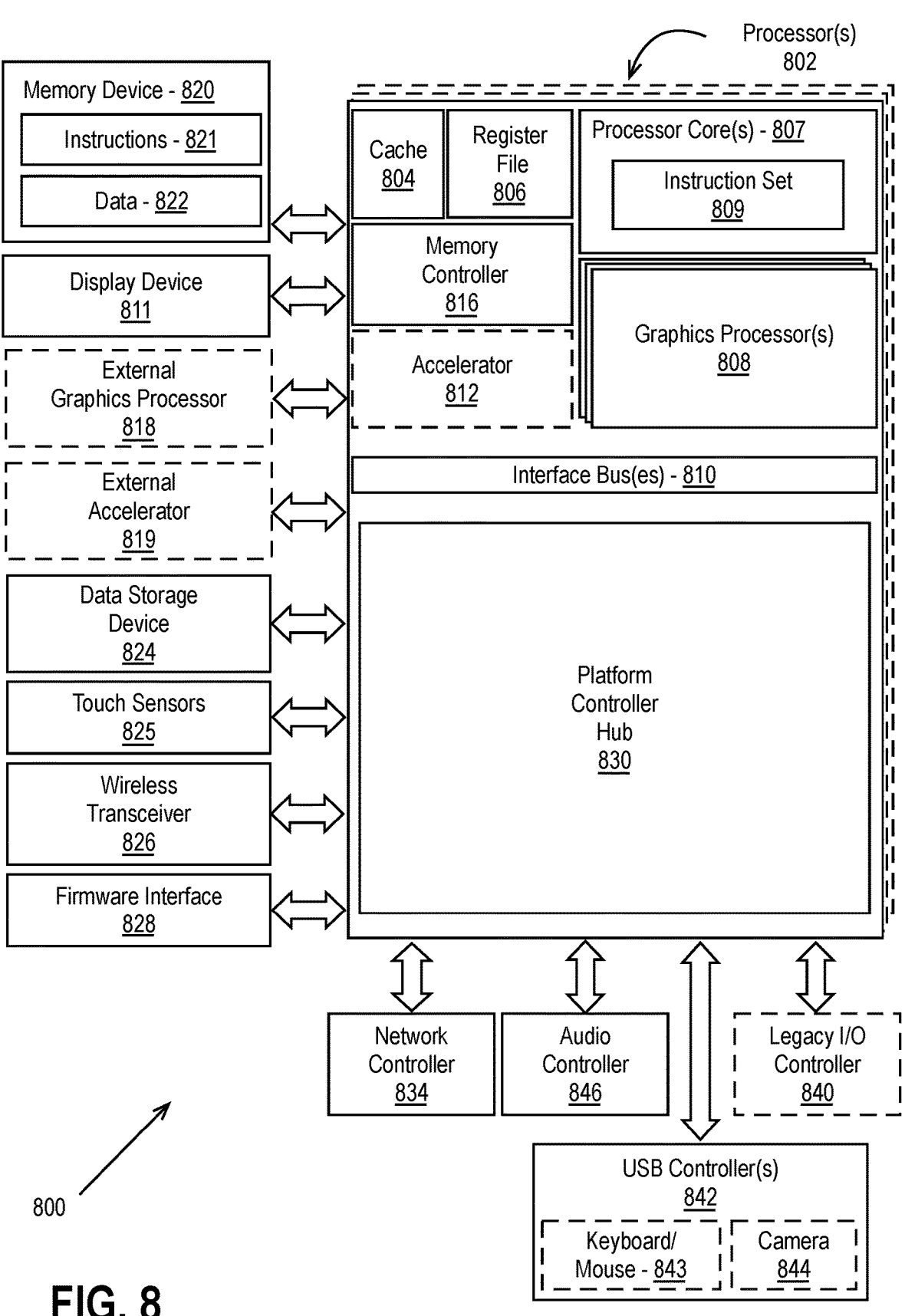
FIG. 8 is a block diagram of a processing system, according to an embodiment.

FIG. 8 is a block diagram of a processing system 800, according to an embodiment. Processing system 800 may be used in a single processor desktop system, a multiprocessor workstation system, or a server system having a large number of processors 802 or processor cores 807. In one embodiment, the processing system 800 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 800 can include, couple with, or be integrated within: a server-based gaming platform; a game console, including a game and media console; a mobile gaming console, a handheld game console, or an online game console. In some embodiments the processing system 800 is part of a mobile phone, smart phone, tablet computing device or mobile Internet-connected device such as a laptop with low internal storage capacity. Processing system 800 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 800 includes or is part of a television or set top box device. In one embodiment, processing system 800 can include, couple with, or be integrated within a self-driving vehicle such as a bus, tractor trailer, car, motor or electric power cycle, plane or glider (or any combination thereof). The self-driving vehicle may use processing system 800 to process the environment sensed around the vehicle.

In some embodiments, the one or more processors 802 each include one or more processor cores 807 to process instructions which, when executed, perform operations for system or user software. In some embodiments, at least one of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). One or more processor cores 807 may process a different instruction set 809, which may include instructions to facilitate the emulation of other instruction sets. Processor core 807 may also include other processing devices, such as a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 can be additionally included in processor 802 and may include different types of registers for storing different types of data (e.g., integer registers, floating-point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the processing system 800. The interface bus 810, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 802 include an integrated memory controller 816 and a platform controller hub 830. The memory controller 816 facilitates communication between a memory device and other components of the processing system 800, while the platform controller hub (PCH) 830 provides connections to I/O devices via a local I/O bus.

The memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the processing system 800, to store data 822 and instructions 821 for use when the one or more processors 802 executes an application or process. Memory controller 816 also couples with an optional external graphics processor 818, which may communicate with the one or more graphics processors 808 in processors 802 to perform graphics and media operations. In some embodiments, graphics, media, and or compute operations may be assisted by an accelerator 812 which is a coprocessor that can be configured to perform a specialized set of graphics, media, or compute operations. For example, in one embodiment the accelerator 812 is a matrix multiplication accelerator used to optimize machine learning or compute operations. In one embodiment the accelerator 812 is a ray-tracing accelerator that can be used to perform ray-tracing operations in concert with the graphics processor 808. In one embodiment, an external accelerator 819 may be used in place of or in concert with the accelerator 812.

In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., non-volatile memory, volatile memory, hard disk drive, flash memory, NAND, 3D NAND, 3D XPoint, etc.). The data storage device 824 can connect via a storage interface (e.g., SATA) or via a peripheral bus, such as a Peripheral Component Interconnect bus (e.g., PCI, PCI express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, 5G, or Long-Term Evolution (LTE) transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high-definition audio controller. In one embodiment the processing system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

It will be appreciated that the processing system 800 shown is exemplary and not limiting, as other types of data processing systems that are differently configured may also be used. For example, an instance of the memory controller 816 and platform controller hub 830 may be integrated into a discrete external graphics processor, such as the external graphics processor 818. In one embodiment the platform controller hub 830 and/or memory controller 816 may be external to the one or more processor(s) 802. For example, the processing system 800 can include an external memory controller 816 and platform controller hub 830, which may be configured as a memory controller hub and peripheral controller hub within a system chipset that is in communication with the processor(s) 802.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling. Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 800 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 9A:
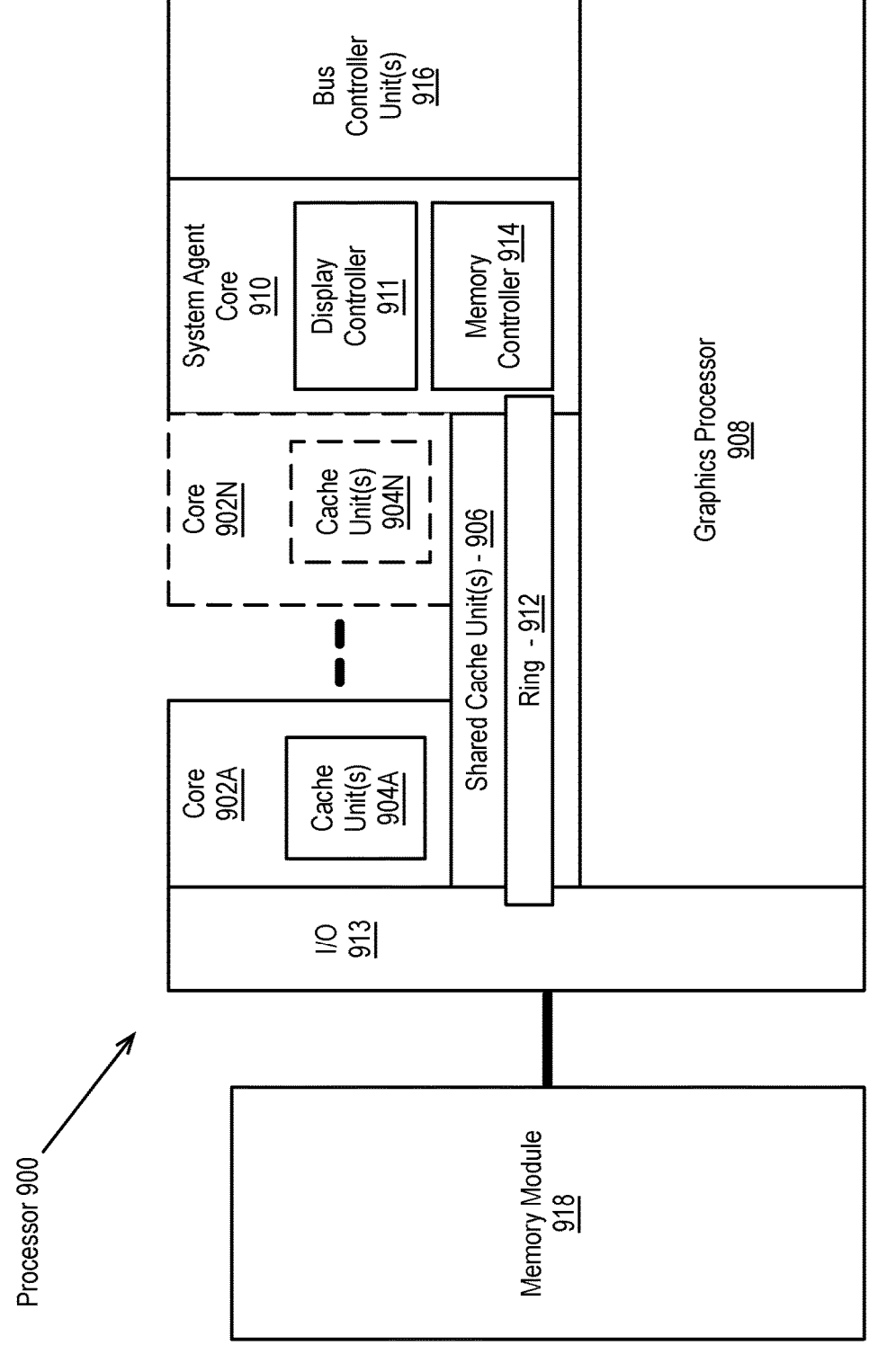
FIG. 9A-9B illustrate computing systems and graphics processors provided by embodiments described herein.
Figure 9B:
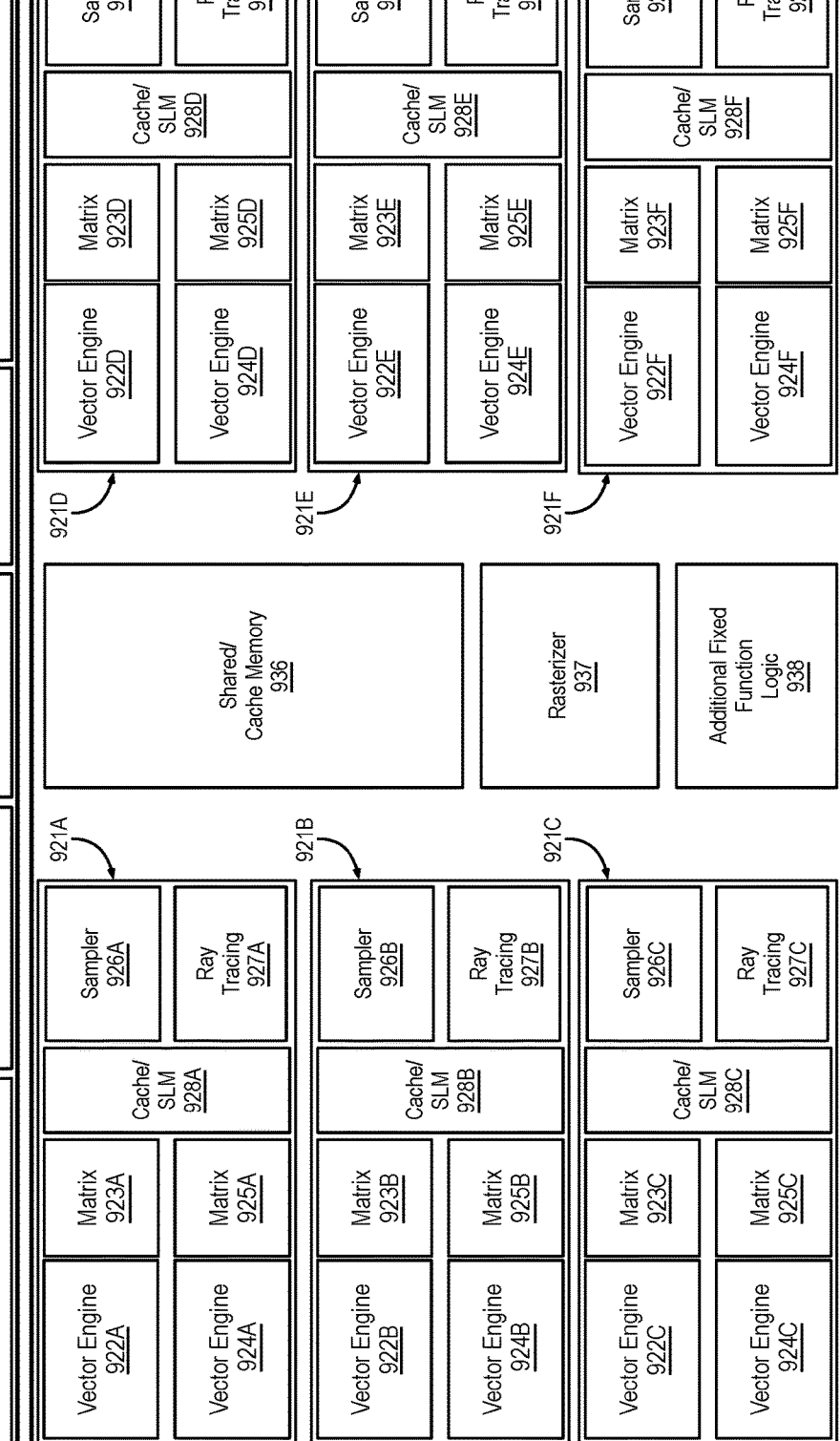

FIG. 9A-9B illustrate computing systems and graphics processors provided by embodiments described herein. The elements of FIG. 9A-9B having the same reference numbers (or names) as the elements of any other figure herein can operate or function in any manner similar to that described elsewhere herein but are not limited to such.

FIG. 9A is a block diagram of an embodiment of a processor 900 having one or more processor cores 902A-902N, one or more integrated memory controllers 914, and an integrated graphics processor 908. Processor 900 includes at least one core 902A and can additionally include additional cores up to and including additional core 902N, as represented by the dashed lined boxes. Each of processor cores 902A-902N includes one or more internal cache units 904A-904N. In some embodiments each processor core also has access to one or more shared cached units 906. The internal cache units 904A-904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-904N.

In some embodiments, processor 900 may also include a set of one or more bus controller units 916 and a system agent core 910. The one or more bus controller units 916 manage a set of peripheral buses, such as one or more PCI or PCI express busses. System agent core 910 provides management functionality for the various processor components. In some embodiments, system agent core 910 includes one or more integrated memory controllers 914 to manage access to various external memory devices (not shown).

In some embodiments, one or more of the processor cores 902A-902N include support for simultaneous multi-threading. In such embodiment, the system agent core 910 includes components for coordinating and operating cores 902A-902N during multi-threaded processing. System agent core 910 may additionally include a power control unit (PCU), which includes logic and components to regulate the power state of processor cores 902A-902N and graphics processor 908.

In some embodiments, processor 900 additionally includes a graphics processor 908 to execute graphics processing operations. In some embodiments, the graphics processor 908 couples with the set of shared cache units 906, and the system agent core 910, including the one or more integrated memory controllers 914. In some embodiments, the system agent core 910 also includes a display controller 911 to drive graphics processor output to one or more coupled displays. In some embodiments, display controller 911 may also be a separate module coupled with the graphics processor via at least one interconnect, or may be integrated within the graphics processor 908.

In some embodiments, a ring-based interconnect 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring-based interconnect 912 via an I/O link 913.

The exemplary I/O link 913 represents at least one of multiple varieties of I/O interconnects, including an on package I/O interconnect which facilitates communication between various processor components and a memory module 918, such as an eDRAM module or high-bandwidth memory (HBM) memory modules. In one embodiment the memory module 918 can be an eDRAM module and each of the processor cores 902A-902N and graphics processor 908 can use the memory module 918 as a shared LLLC. In one embodiment, the memory module 918 is an HBM memory module that can be used as a primary memory module or as part of a tiered or hybrid memory system that also includes double data rate synchronous DRAM, such as DDR5 SDRAM, and/or persistent memory (PMem). The processor 900 can include multiple instances of the I/O link 913 and memory module 918.

In some embodiments, processor cores 902A-902N are homogenous cores executing the same instruction set architecture. In another embodiment, processor cores 902A-902N are heterogeneous in terms of instruction set architecture (ISA), where one or more of processor cores 902A-902N execute a first instruction set, while at least one of the other cores executes a subset of the first instruction set or a different instruction set. In one embodiment, processor cores

902A-902N are heterogeneous in terms of microarchitecture, where one or more cores having a relatively higher power consumption couple with one or more power cores having a lower power consumption. In one embodiment, processor cores 902A-902N are heterogeneous in terms of computational capability. Additionally, processor 900 can be implemented on one or more chips or as an SoC (system-on-a-chip) integrated circuit having the illustrated components, in addition to other components.

FIG. 9B is a block diagram of hardware logic of a graphics processor core block 919, according to some embodiments described herein. The graphics processor core block 919 is exemplary of one partition of a graphics processor. A graphics processor as described herein may include multiple graphics core blocks based on target power and performance envelopes. Each graphics processor core block 919 can include a function block 930 coupled with multiple execution cores 921A-921F that include modular blocks of fixed function logic and general-purpose programmable logic. The graphics processor core block 919 also includes shared/cache memory 936 that is accessible by all execution cores 921A-921F, rasterizer logic 937, and additional fixed function logic 938.

In some embodiments, the function block 930 includes a geometry/fixed function pipeline 931 that can be shared by all execution cores in the graphics processor core block 919. In various embodiments, the geometry/fixed function pipeline 931 includes a 3D geometry pipeline a video front-end unit, a thread spawner and global thread dispatcher, and a unified return buffer manager, which manages unified return buffers. In one embodiment the function block 930 also includes a graphics SoC interface 932, a graphics microcontroller 933, and a media pipeline 934. The graphics SoC interface 932 provides an interface between the graphics processor core block 919 and other core blocks within a graphics processor or compute accelerator SoC. The graphics microcontroller 933 is a programmable sub-processor that is configurable to manage various functions of the graphics processor core block 919, including thread dispatch, scheduling, and pre-emption. The media pipeline 934 includes logic to facilitate the decoding, encoding, pre-processing, and/or post-processing of multimedia data, including image and video data. The media pipeline 934 implement media operations via requests to compute or sampling logic within the execution cores 921-921F. One or more pixel backends 935 can also be included within the function block 930. The pixel backends 935 include a cache memory to store pixel color values and can perform blend operations and lossless color compression of rendered pixel data.

In one embodiment the SoC interface 932 enables the graphics processor core block 919 to communicate with general-purpose application processor cores (e.g., CPUs) and/or other components within an SoC or a system host CPU that is coupled with the SoC via a peripheral interface. The SoC interface 932 also enables communication with off-chip memory hierarchy elements such as a shared last level cache memory, system RAM, and/or embedded on-chip or on-package DRAM. The SoC interface 932 can also enable communication with fixed function devices within the SoC, such as camera imaging pipelines, and enables the use of and/or implements global memory atomics that may be shared between the graphics processor core block 919 and CPUs within the SoC. The SoC interface 932 can also implement power management controls for the graphics processor core block 919 and enable an interface between a clock domain of the graphics processor core block 919 and other clock domains within the SoC. In one embodiment the SoC interface 932 enables receipt of command buffers from a command streamer and global thread dispatcher that are configured to provide commands and instructions to each of one or more graphics cores within a graphics processor. The commands and instructions can be dispatched to the media pipeline 934 when media operations are to be performed, the geometry and fixed function pipeline 931 when graphics processing operations are to be performed. When compute operations are to be performed, compute dispatch logic can dispatch the commands to the execution cores 921A-921F, bypassing the geometry and media pipelines.

The graphics microcontroller 933 can be configured to perform various scheduling and management tasks for the graphics processor core block 919. In one embodiment the graphics microcontroller 933 can perform graphics and/or compute workload scheduling on the various graphics parallel engines within execution unit (EU) arrays 922A-922F, 924A-924F within the execution cores 921A-921F. In this scheduling model, host software executing on a CPU core of an SoC including the graphics processor core block 919 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 933 can also facilitate low-power or idle states for the graphics processor core block 919, providing the graphics processor core block 919 with the ability to save and restore registers within the graphics processor core block 919 across low-power state transitions independently from the operating system and/or graphics driver software on the system.

The graphics processor core block 919 may have greater than or fewer than the illustrated execution cores 921A-921F, up to N modular execution cores. For each set of N execution cores, the graphics processor core block 919 can also include shared/cache memory 936, which can be configured as shared memory or cache memory, rasterizer logic 937, and additional fixed function logic 938 to accelerate various graphics and compute processing operations.

Within each of the execution cores 921A-921F is a set of execution resources that may be used to perform graphics, media, and compute operations in response to requests by graphics pipeline, media pipeline, or shader programs. The graphics execution cores 921A-921F include multiple vector engines 922A-922F, 924A-924F, matrix acceleration units 923A-923F, 925A-925D, cache/shared local memory (SLM), a sampler 926A-926F, and a ray tracing unit 927A-927F.

The vector engines 922A-922F, 924A-924F are general-purpose graphics processing units capable of performing floating-point and integer/fixed-point logic operations in service of a graphics, media, or compute operation, including graphics, media, or compute/GPGPU programs. The vector engines 922A-922F, 924A-924F can operate at variable vector widths using SIMD, SIMT, or SIMT+SIMD execution modes. The matrix acceleration units 923A-923F, 925A-925D include matrix-matrix and matrix-vector acceleration logic that improves performance on matrix operations, particularly low and mixed precision (e.g., INT8, FP16) matrix operations used for machine learning. In one embodiment, each of the matrix acceleration units 923A-923F, 925A-925D includes one or more systolic arrays of processing elements that can perform concurrent matrix multiply or dot product operations on matrix elements.

The sampler 925A-925F can read media or texture data into memory and can sample data differently based on a configured sampler state and the texture/media format that is being read. Threads executing on the vector engines 922A-922F, 924A-924F or matrix acceleration units 923A-923F, 925A-925D can make use of the cache/SLM 928A-928F within each execution core. The cache/SLM 928A-928F can be configured as cache memory or as a pool of shared memory that is local to each of the respective execution cores 921A-921F. The ray tracing units 927A-927F within the execution cores 921A-921F include ray traversal/intersection circuitry for performing ray traversal using bounding volume hierarchies (BVHs) and identifying intersections between rays and primitives enclosed within the BVH volumes. In one embodiment the ray tracing units 927A-927F include circuitry for performing depth testing and culling (e.g., using a depth buffer or similar arrangement). In one implementation, the ray tracing units 927A-927F perform traversal and intersection operations in concert with image denoising, at least a portion of which may be performed using an associated matrix acceleration unit 923A-923F, 925A-925D.

Figure 10A:
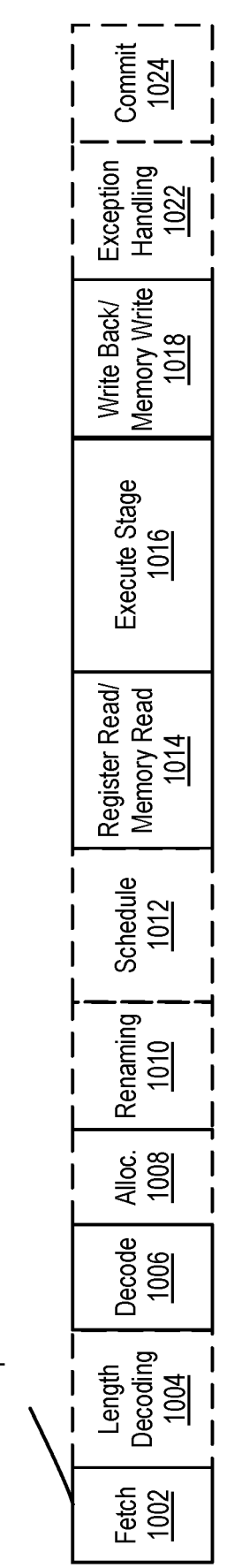
FIG. 10A-10B illustrate an exemplary in-order pipeline and an exemplary register renaming, out-of-order issue/execution pipeline of a processor and an associated processor architecture.
Figure 10B:
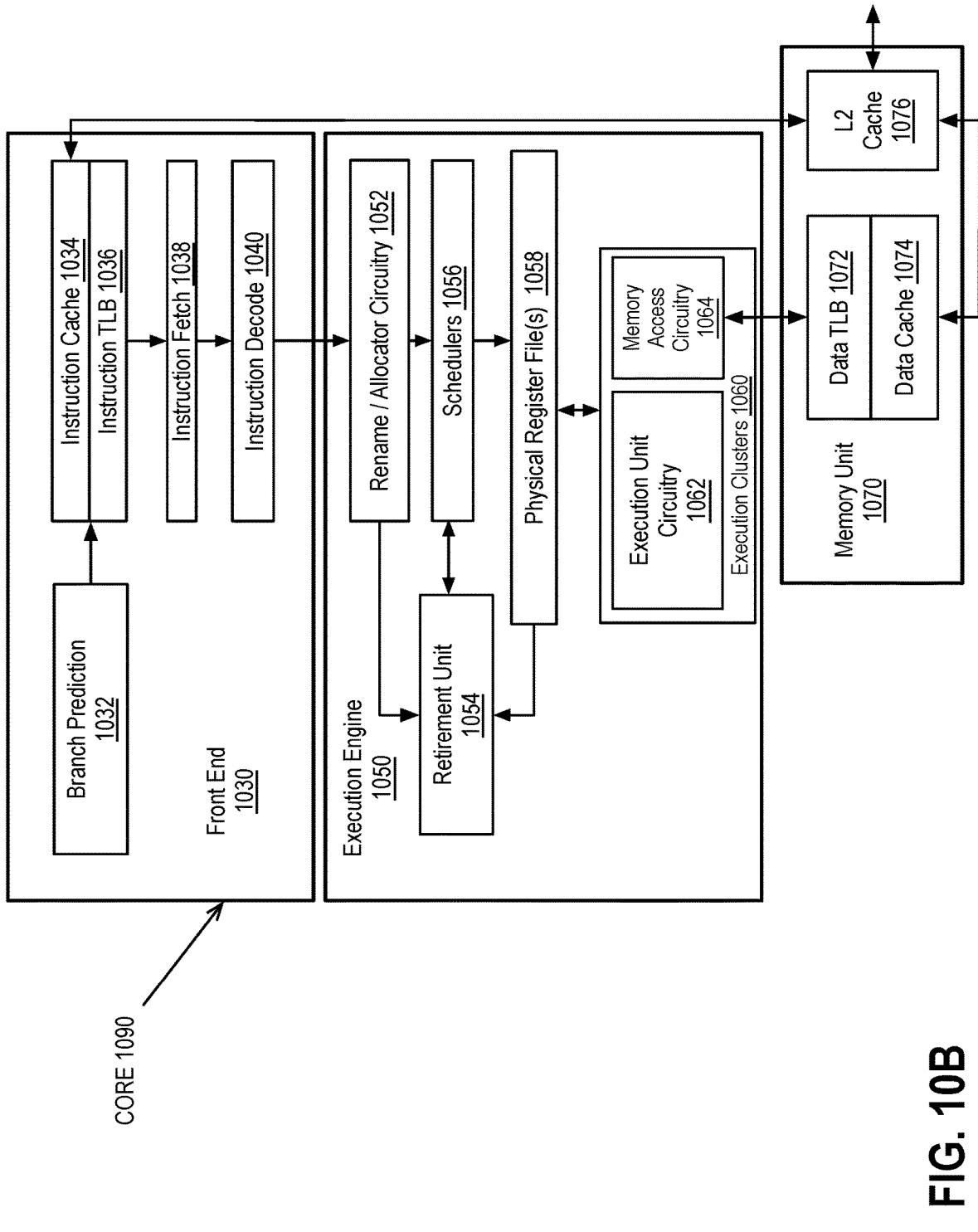

FIG. 10A is a block diagram illustrating an exemplary in-order pipeline and an exemplary register renaming, out-of-order issue/execution pipeline of a processor described herein. FIG. 10B is a block diagram illustrating architecture for a processor core that can be configured as an in-order architecture core or a register renaming, out-of-order issue/execution architecture core. Given that the in-order aspect is a subset of the out-of-order aspect, the out-of-order aspect will be described.

As shown in FIG. 10A, a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

As shown in FIG. 10B a processor core 1090 can include front end unit circuitry 1030 coupled to execution engine circuitry 1050, both of which are coupled to memory unit circuitry 1070. The processor core 1090 can be one of processor cores 902A-902N as in FIG. 9A. The processor core 1090 may be a reduced instruction set computing (RISC) core, a complex instruction set computing (CISC) core, a very long instruction word (VLIW) core, or a hybrid or alternative core type. As yet another option, the processor core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the processor core 1090 includes a microcode ROM (not shown) or other medium that stores microcode for certain macroinstructions (e.g., in decode unit circuitry 1040 or otherwise within the front end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit circuitry 1062 and a set of one or more memory access circuitry 1064. The execution unit circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to level 2 (L2) cache circuitry 1076 in the memory unit circuitry 1070. In one embodiment, the instruction cache circuitry 1034 and the data cache circuitry 1074 are combined into a single instruction and data cache (not shown) in L2 cache circuitry 1076, a level 3 (L3) cache unit circuitry (not shown), and/or main memory. The L2 cache circuitry 1076 is coupled to one or more other levels of cache and eventually to a main memory.

The processor core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the processor core 1090 includes logic to support a packed data instruction set extension (e.g., AVX1, AVX2, AVX512), thereby allowing the operations used by many multimedia applications or high-performance compute applications, including homomorphic encryption applications, to be performed using packed or vector data types.

The processor core 1090 of FIG. 10B can implement the processor pipeline 1000 of FIG. 10A as follows: 1) the instruction fetch circuitry 1038 performs the fetch and length decoding stages 1002 and 1004; 2) the instruction decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) circuitry 1058 and the memory unit circuitry 1070 perform the register read/memory read stage 1014; the execution cluster 1060 perform the execute stage 1016; 6) the memory unit circuitry 1070 and the physical register file(s) circuitry 1058 perform the write back/memory write stage 1018; 7) various units (unit circuitry) may be involved in the exception handling stage 1022; and 8) the retirement unit circuitry 1054 and the physical register file(s) circuitry 1058 perform the commit stage 1024.

Figure 11:
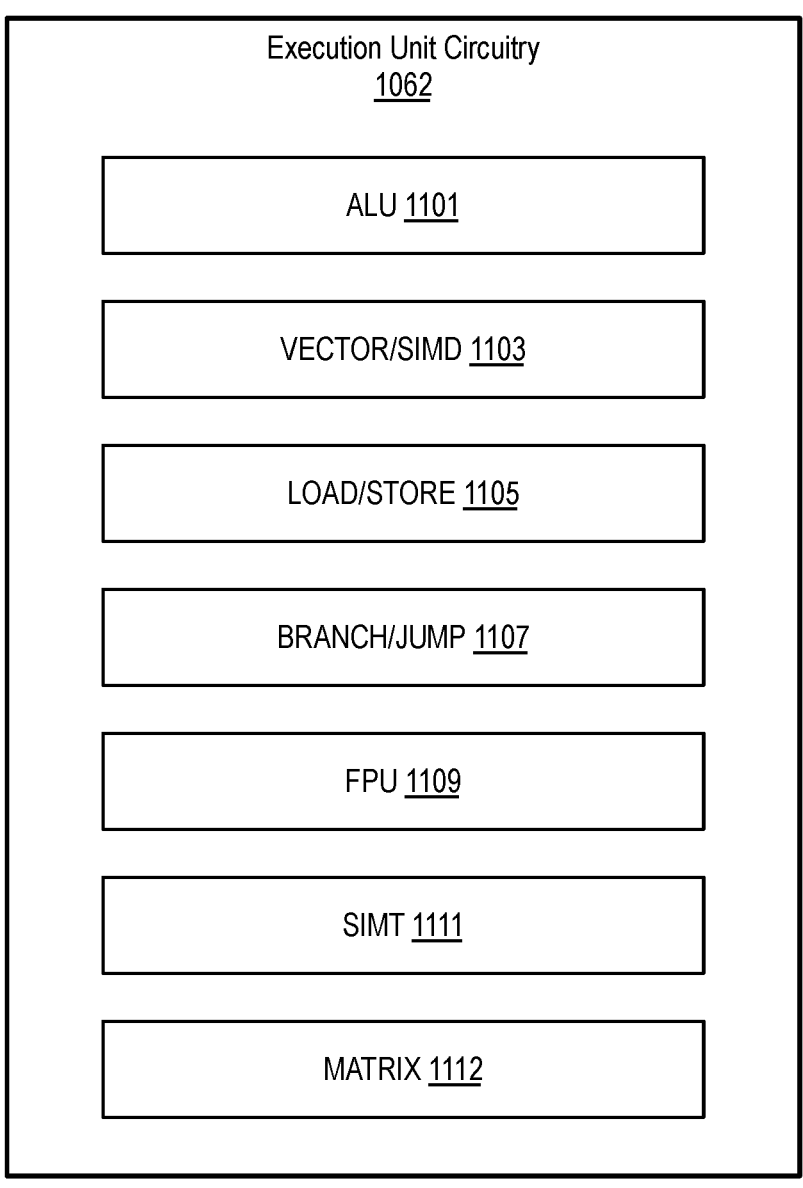
FIG. 11 illustrates execution unit circuitry according to embodiments described herein.

FIG. 11 illustrates execution unit circuitry, such as execution unit circuitry 1062 of FIG. 10B, according to embodiments described herein. As illustrated, execution unit circuity 1062 may include one or more ALU circuits 1101, vector/SIMD unit circuits 1103, load/store unit circuits 1105, branch/jump unit circuits 1107, and/or FPU circuits 1109. Where the execution unit circuitry 1062 is configurable to perform GPGPU parallel compute operations, the execution unit circuitry can additionally include SIMT circuits 1111 and/or matrix acceleration circuits 1112. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. FPU circuits 1109 perform floating-point arithmetic. In some embodiments, SIMT circuits 1111 enable the execution unit circuitry 1062 to execute SIMT GPGPU compute programs using one or more ALU circuits 1101 and/or Vector/SIMD unit circuits 1103. In some embodiments, execution unit circuitry 1062 includes matrix acceleration circuits 1112 including hardware logic of one or more of the matrix acceleration units 923A-923F, 925A-925D of FIG. 9B. The width of the execution unit(s) circuitry 1062 varies depending upon the embodiment and can range from 16 bits to 4,096 bits. In some embodiments, two or more smaller execution units are logically combined to form a larger execution unit (e.g., two 128-bit execution units are logically combined to form a 256-bit execution unit).

Figure 12:
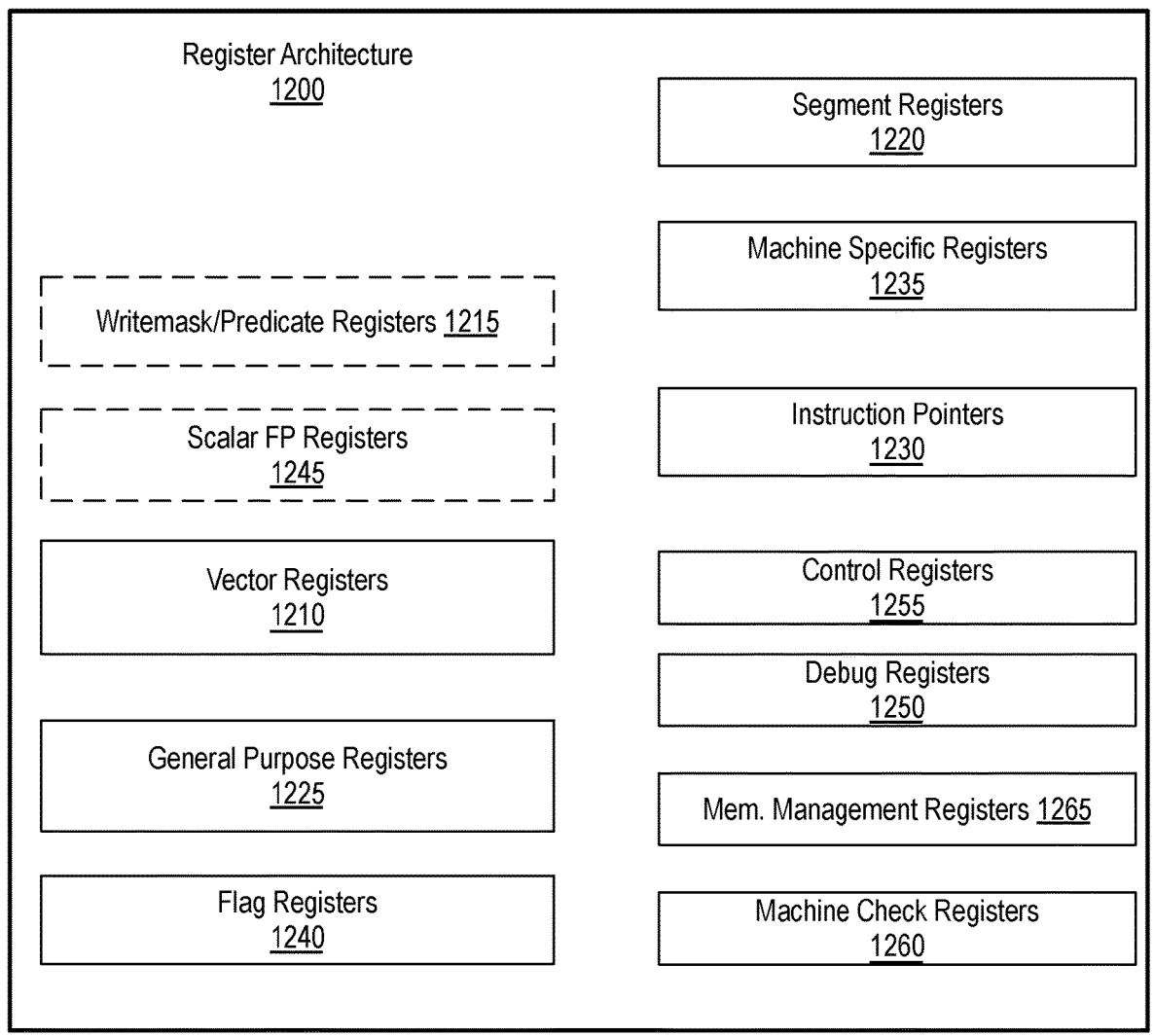
FIG. 12 is a block diagram of a register architecture according to some embodiments.

FIG. 12 is a block diagram of a register architecture 1200 according to some embodiments. As illustrated, there are vector registers 1210 that vary from 128-bit to 1,024 bits width. In some embodiments, the vector registers 1210 are physically 512-bits and, depending upon the mapping, only some of the lower bits are used. For example, in some embodiments, the vector registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system related functions and are not accessible to an application program. Machine check registers 1260 consist of control, status, and error reporting MSRs that are used to detect and report on hardware errors.

One or more instruction pointer registers 1230 store an instruction pointer value. Control register(s) 1255 (e.g., CR0-CR4) determine the operating mode of a processor and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments use wider or narrower registers and can also use more, less, or different register files and registers.

Exemplary Instruction Formats

Instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figures 13, 14:
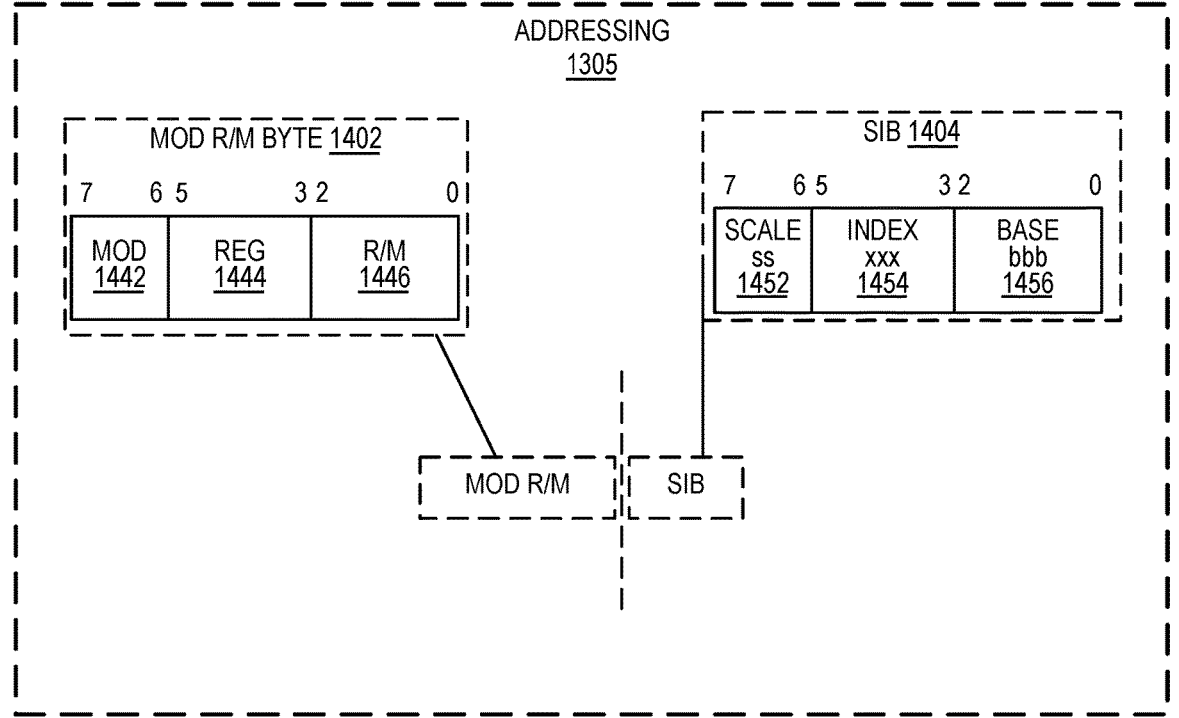
FIG. 13 illustrates embodiments of an instruction format, according to an embodiment.
FIG. 14 illustrates embodiments of the addressing field of the instruction format.

FIG. 13 illustrates embodiments of an instruction format, according to an embodiment. As illustrated, an instruction may include multiple components including, but not limited to one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

The addressing field 1305 is used to address one or more operands of the instruction, such as a location in memory or one or more registers.

FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor.

The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

Figures 15, 16A, 16B, 16C, 16D:
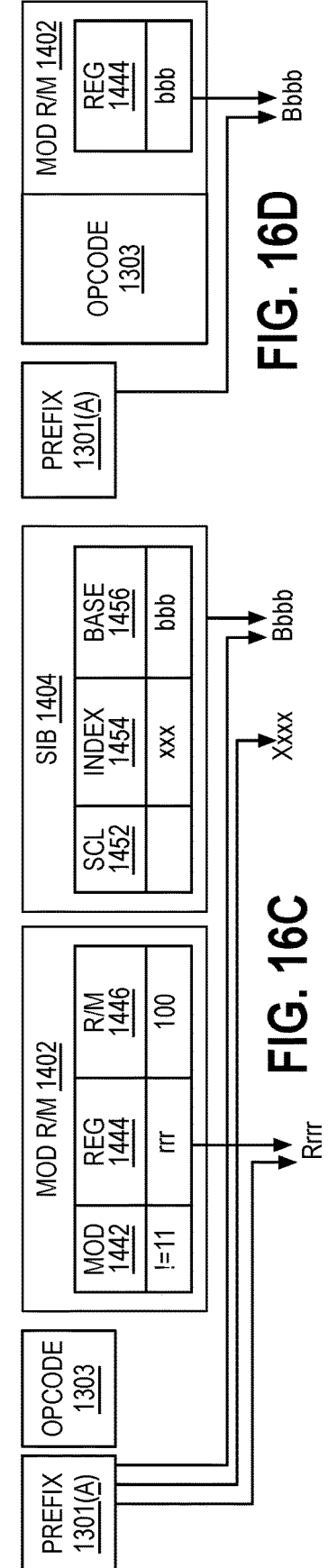
FIG. 15 illustrates embodiments of a first prefix of the instruction format.
FIGS. 16A-16D illustrate use of the R, X, and B fields of the first prefix, according to some embodiments.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general-purpose registers 1225).

FIGS. 16A-16D illustrate use of the R, X, and B fields of the first prefix 1301(A), according to some embodiments. FIG. 16A illustrates R and B from the first prefix 1301(A) being used to extend the reg field 1444 and R/M field 1446 of the MOD R/M byte 1402 when the SIB byte 1404 is not used for memory addressing. FIG. 16B illustrates R and B from the first prefix 1301(A) being used to extend the reg field 1444 and R/M field 1446 of the MOD R/M byte 1402 when the SIB byte 1404 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16D illustrates B from the first prefix 1301(A) being used to extend the reg field 1444 of the MOD R/M byte 1402 when a register is encoded in the opcode 1303.

Figures 17A, 17B:
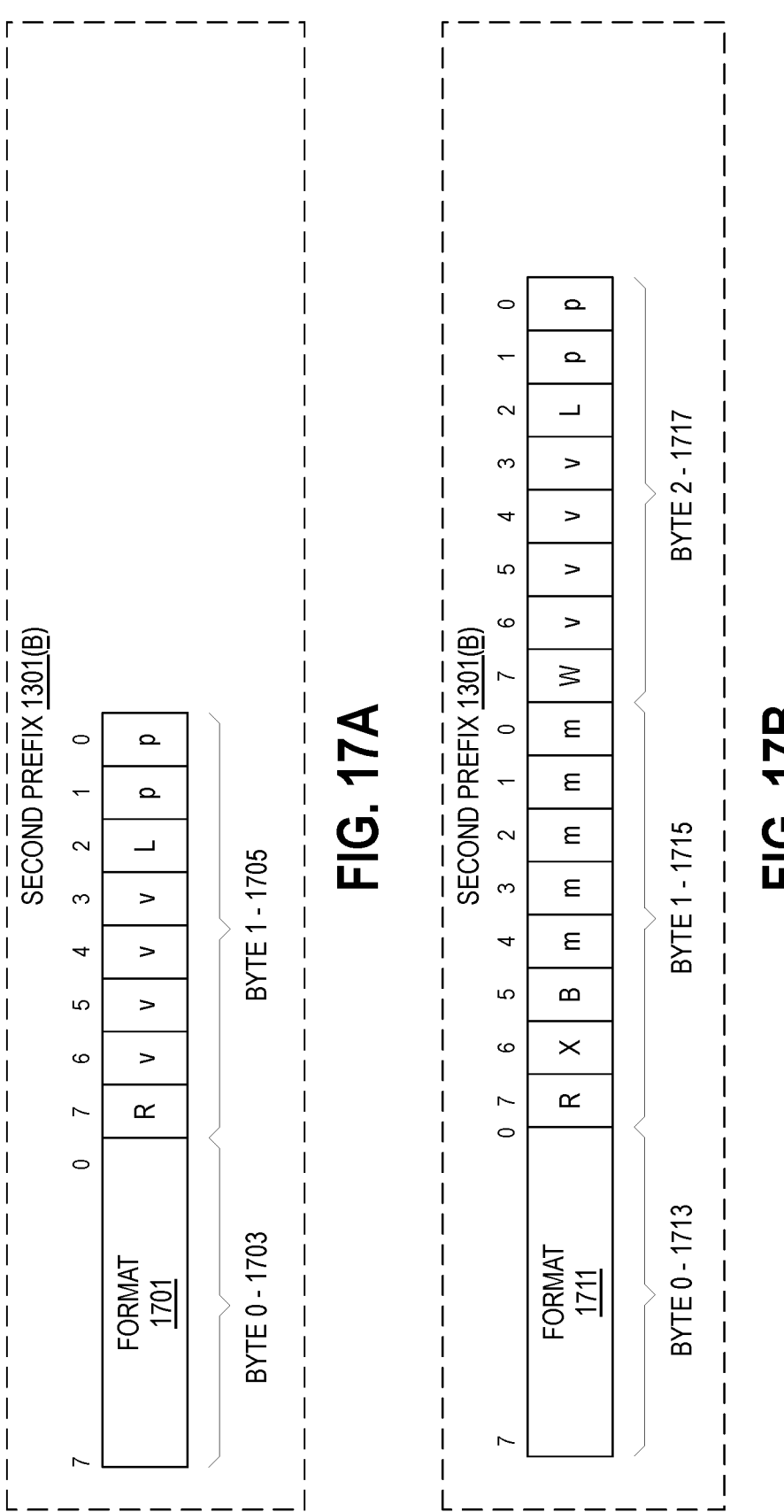
FIG. 17A-17B illustrate a second prefix, according to embodiments.

FIG. 17A-17B illustrate a second prefix 1301(B), according to embodiments. In some embodiments, the second prefix 1301(B) is an embodiment of a VEX prefix. The second prefix 1301(B) encoding allows instructions to have more than two operands, and allows SIMD vector registers (e.g., vector registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates embodiments of a two-byte form of the second prefix 1301(B). In one example, a format field 1701 (byte 0 1703) contains the value C5H. In one example, byte 1 1705 includes a "R" value in bit[7]. This value is the complement of the same value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

FIG. 17B illustrates embodiments of a three-byte form of the second prefix 1301(B). in one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector) and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
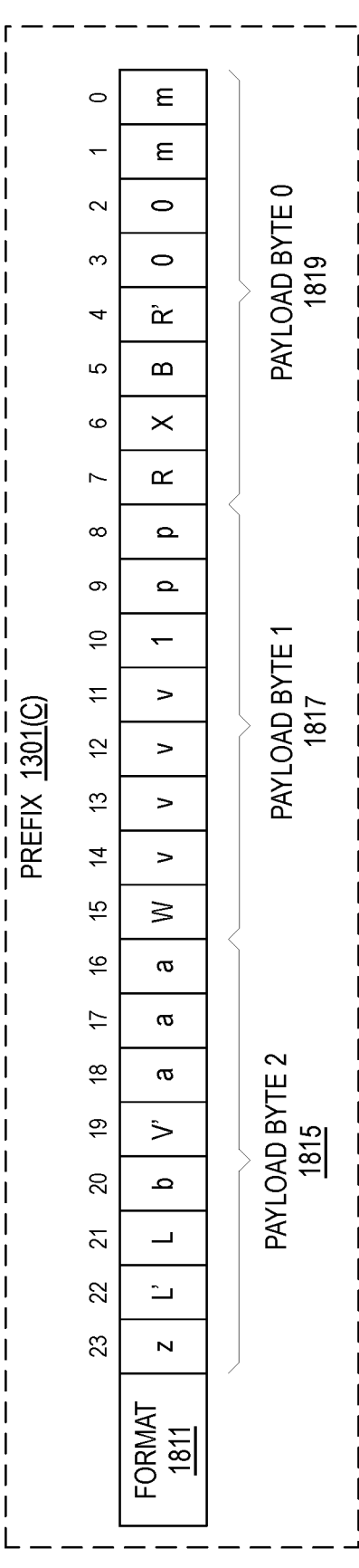
FIG. 18 illustrates a third prefix, according to embodiments.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 0x62, which is a unique value that identifies a vector friendly instruction format. Subsequent bytes are referred to as payload bytes 1815, 1817, 1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=0x66, 10=0xF3, and 11=0xF2). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1301(B) and may serve as an opcode extension bit or operand size promotion.

P[18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 16

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 17

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 18

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/M R/M | k0-7 | 1st Source |
| {k1] | aaa | k0[1]-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired, as the mechanisms described herein are not limited in scope to any particular programming language. Additionally, the language may be a compiled or interpreted language.

The mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

ISA Emulation and Binary Translation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
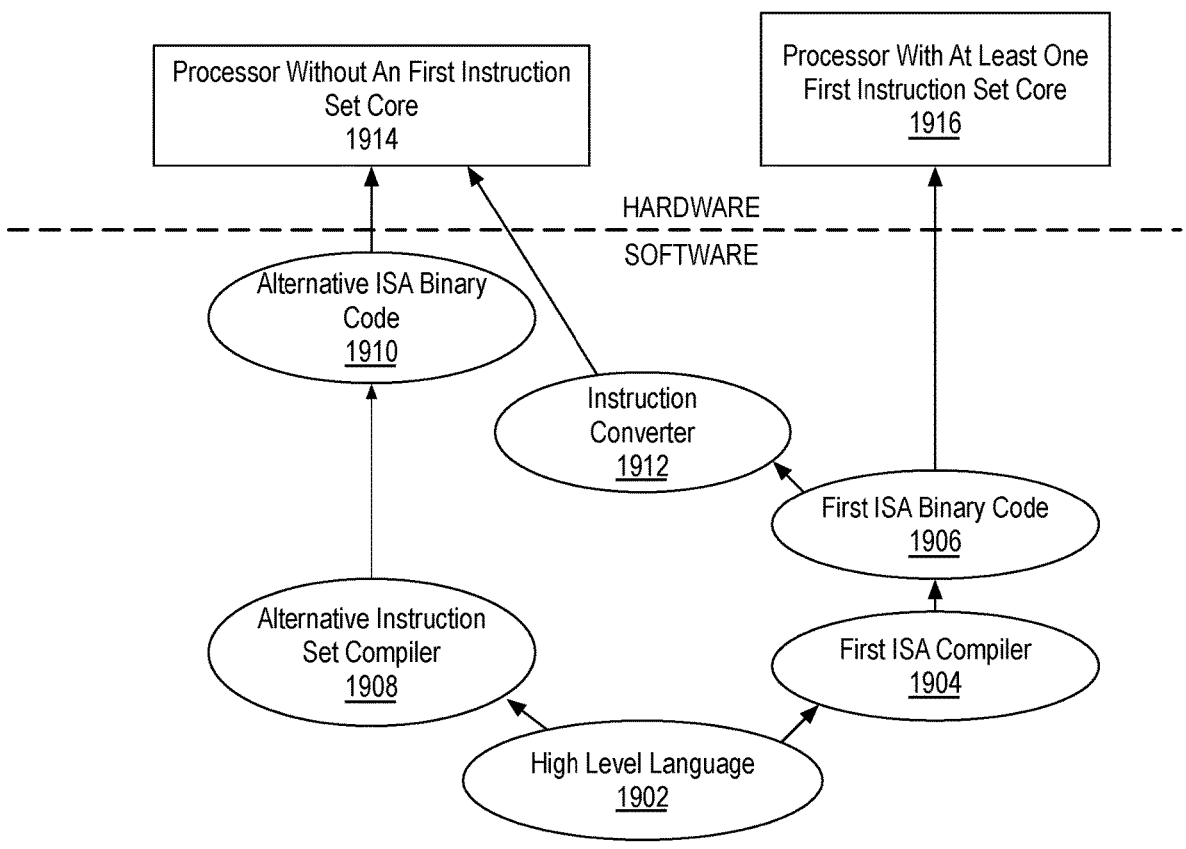
FIG. 19 illustrates a block diagram contrasting the use of a software instruction converter to convert binary instructions in a source instruction set to binary instructions in a target instruction set, according to an embodiment.

FIG. 19 illustrates a block diagram contrasting the use of a software instruction converter to convert binary instructions in a source instruction set to binary instructions in a target instruction set, according to an embodiment. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 20A-20D illustrate IP core development and associated package assemblies that can be assembled from diverse IP cores.

Figure 20A:
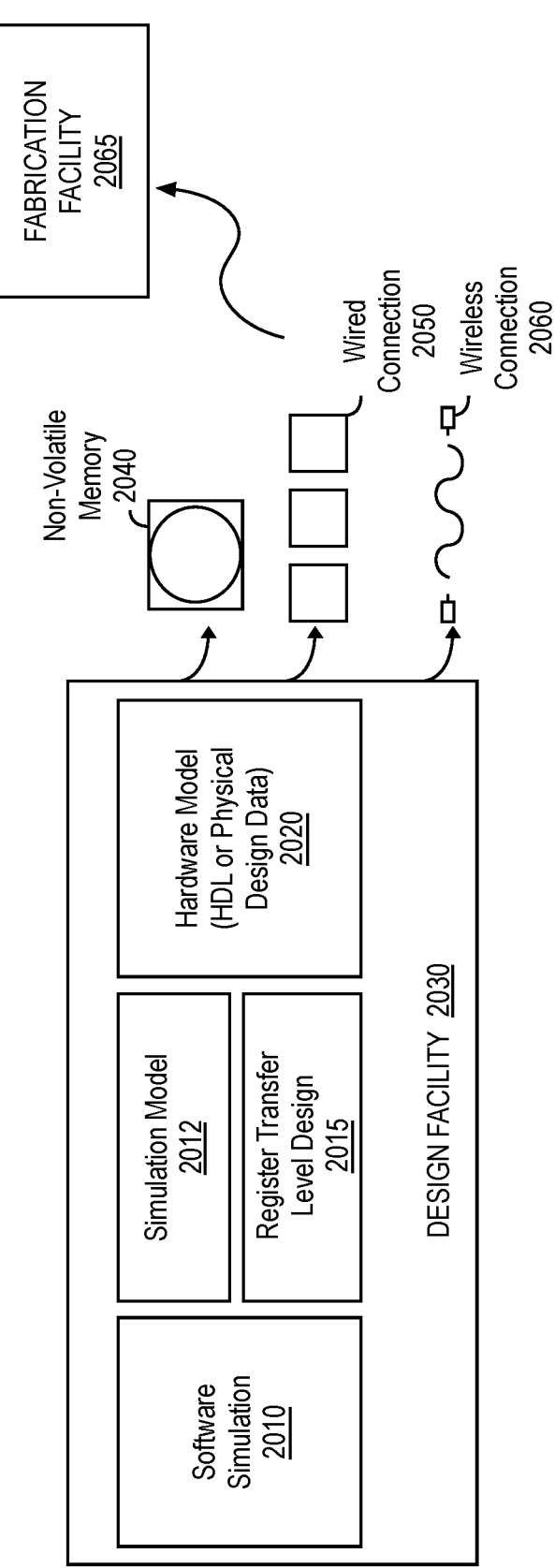
FIG. 20A-20D illustrate IP core development and associated package assemblies that can be assembled from diverse IP cores.

FIG. 20A is a block diagram illustrating an IP core development system 2000 that may be used to manufacture an integrated circuit to perform operations according to an embodiment. The IP core development system 2000 may be used to generate modular, re-usable designs that can be incorporated into a larger design or used to construct an entire integrated circuit (e.g., an SOC integrated circuit). A design facility 2030 can generate a software simulation 2010 of an IP core design in a high-level programming language (e.g., C/C++). The software simulation 2010 can be used to design, test, and verify the behavior of the IP core using a simulation model 2012. The simulation model 2012 may include functional, behavioral, and/or timing simulations. A register transfer level (RTL) design 2015 can then be created or synthesized from the simulation model 2012. The RTL design 2015 is an abstraction of the behavior of the integrated circuit that models the flow of digital signals between hardware registers, including the associated logic performed using the modeled digital signals. In addition to an RTL design 2015, lower-level designs at the logic level or transistor level may also be created, designed, or synthesized. Thus, the particular details of the initial design and simulation may vary.

The RTL design 2015 or equivalent may be further synthesized by the design facility into a hardware model 2020, which may be in a hardware description language (HDL), or some other representation of physical design data. The HDL may be further simulated or tested to verify the IP core design. The IP core design can be stored for delivery to a $3^{rd}$ party fabrication facility 2065 using non-volatile memory 2040 (e.g., hard disk, flash memory, or any non-volatile storage medium). Alternatively, the IP core design may be transmitted (e.g., via the Internet) over a wired connection 2050 or wireless connection 2060. The fabrication facility 2065 may then fabricate an integrated circuit that is based at least in part on the IP core design. The fabricated integrated circuit can be configured to perform operations in accordance with at least one embodiment described herein.

Figure 20B:
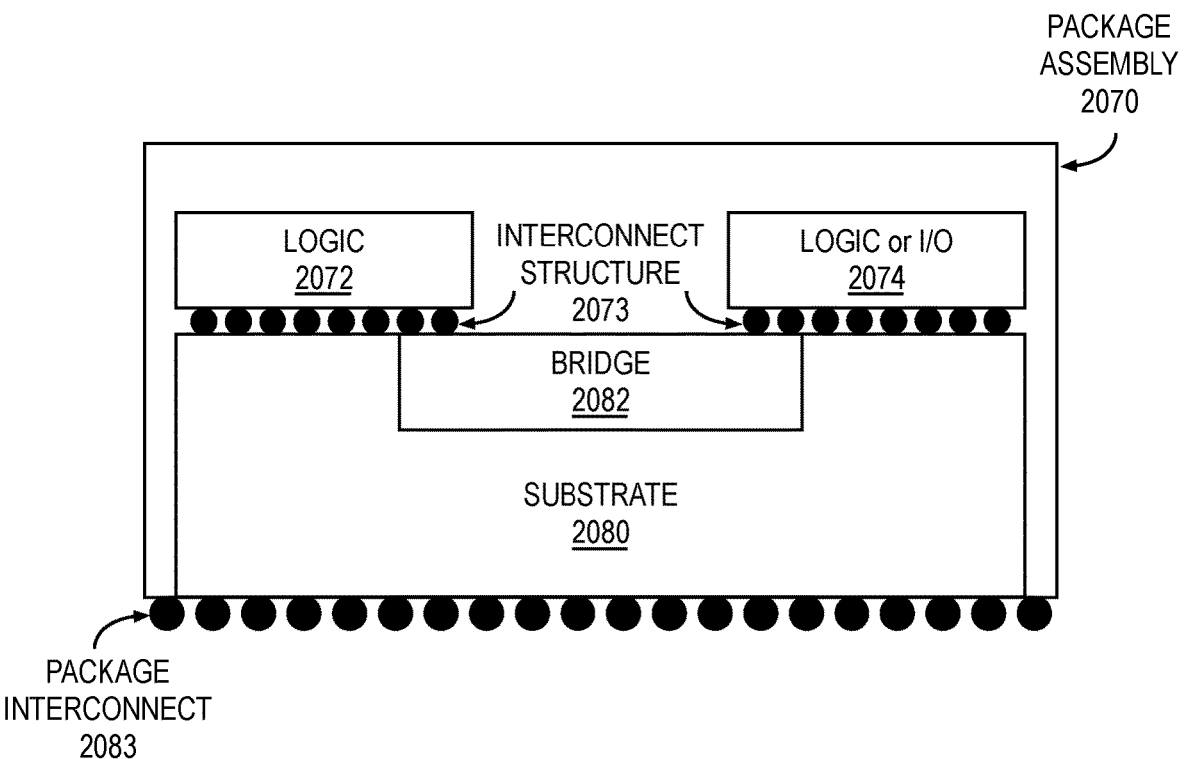

FIG. 20B illustrates a cross-section side view of an integrated circuit package assembly 2070, according to some embodiments described herein. The integrated circuit package assembly 2070 illustrates an implementation of one or more processor or accelerator devices as described herein. The package assembly 2070 includes multiple units of hardware logic 2072, 2074 connected to a substrate 2080. The logic 2072, 2074 may be implemented at least partly in configurable logic or fixed-functionality logic hardware and can include one or more portions of any of the processor core(s), graphics processor(s), or other accelerator devices described herein. Each unit of logic 2072, 2074 can be implemented within a semiconductor die and coupled with the substrate 2080 via an interconnect structure 2073. The interconnect structure 2073 may be configured to route electrical signals between the logic 2072, 2074 and the substrate 2080, and can include interconnects such as, but not limited to bumps or pillars. In some embodiments, the interconnect structure 2073 may be configured to route electrical signals such as, for example, input/output (I/O) signals and/or power or ground signals associated with the operation of the logic 2072, 2074. In some embodiments, the substrate 2080 is an epoxy-based laminate substrate. The substrate 2080 may include other suitable types of substrates in other embodiments. The package assembly 2070 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, the units of logic 2072, 2074 are electrically coupled with a bridge 2082 that is configured to route electrical signals between the logic 2072, 2074. The bridge 2082 may be a dense interconnect structure that provides a route for electrical signals. The bridge 2082 may include a bridge substrate composed of glass or a suitable semiconductor material. Electrical routing features can be formed on the bridge substrate to provide a chip-to-chip connection between the logic 2072, 2074.

Although two units of logic 2072, 2074 and a bridge 2082 are illustrated, embodiments described herein may include more or fewer logic units on one or more dies. The one or more dies may be connected by zero or more bridges, as the bridge 2082 may be excluded when the logic is included on a single die. Alternatively, multiple dies or units of logic can be connected by one or more bridges. Additionally, multiple logic units, dies, and bridges can be connected in other possible configurations, including three-dimensional configurations.

Figure 20C:
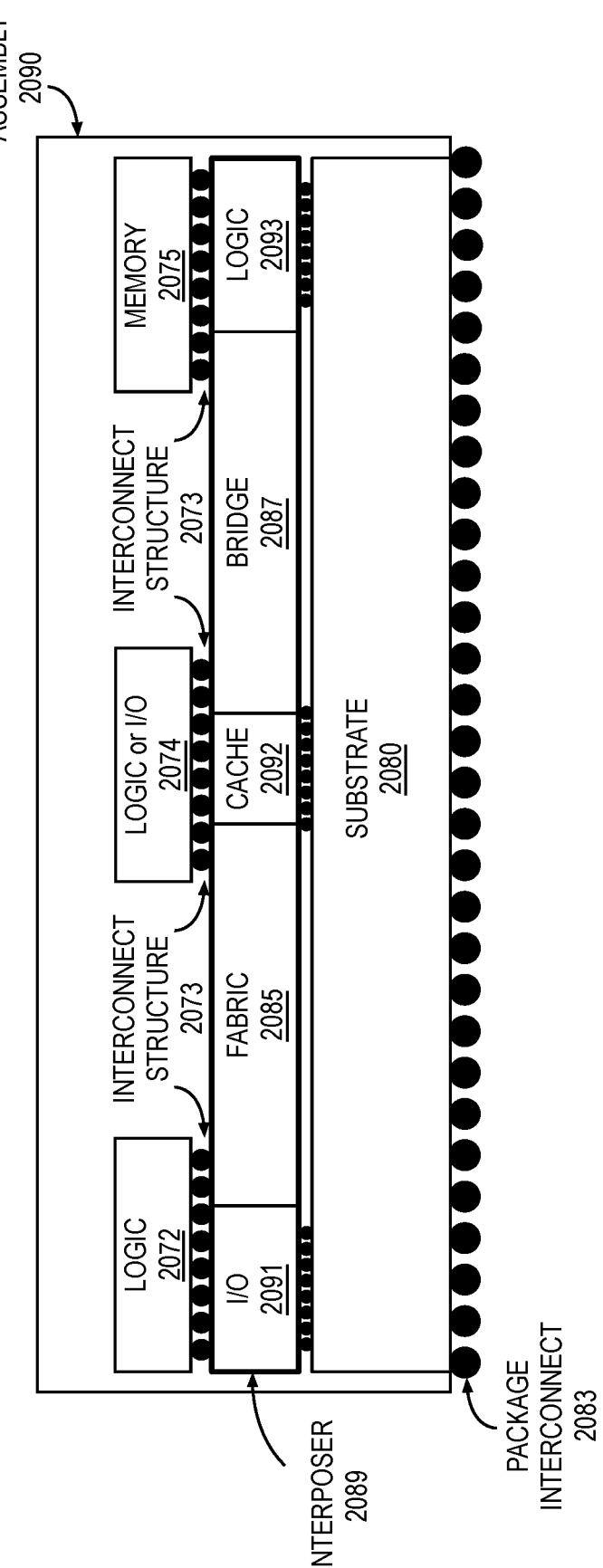

FIG. 20C illustrates a package assembly 2090 that includes multiple units of hardware logic chiplets connected to a substrate 2080. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 2090 can include components and chiplets that are interconnected by a fabric 2085 and/or one or more bridges 2087. The chiplets within the package assembly 2090 may have a 2.5D arrangement using Chip-on-Wafer-on-Substrate stacking in which multiple dies are stacked side-by-side on a silicon interposer 2089 that couples the chiplets with the substrate 2080. The substrate 2080 includes electrical connections to the package interconnect 2083. In one embodiment the silicon interposer 2089 is a passive interposer that includes through-silicon vias (TSVs) to electrically couple chiplets within the package assembly 2090 to the substrate 2080. In one embodiment, silicon interposer 2089 is an active interposer that includes embedded logic in addition to TSVs. In such embodiment, the chiplets within the package assembly 2090 are arranged using 3D face to face die stacking on top of the silicon interposer 2089. The silicon interposer 2089, when an active interposer, can include hardware logic for I/O 2091, cache memory 2092, and other hardware logic 2093, in addition to interconnect fabric 2085 and a silicon bridge 2087. The fabric 2085 enables communication between the various logic chiplets 2072, 2074 and the logic 2091, 2093 within the silicon interposer 2089. The fabric 2085 may be an NoC (Network on Chip) interconnect or another form of packet switched fabric that switches data packets between components of the package assembly. For complex assemblies, the fabric 2085 may be a dedicated chiplet enables communication between the various hardware logic of the package assembly 2090.

Bridge structures 2087 within the silicon interposer 2089 may be used to facilitate a point-to-point interconnect between, for example, logic or I/O chiplets 2074 and memory chiplets 2075. In some implementations, bridge structures 2087 may also be embedded within the substrate 2080. The hardware logic chiplets can include special purpose hardware logic chiplets 2072, logic or I/O chiplets 2074, and/or memory chiplets 2075. The hardware logic chiplets 2072 and logic or I/O chiplets 2074 may be implemented at least partly in configurable logic or fixed-functionality logic hardware and can include one or more portions of any of the processor core(s), graphics processor(s), parallel processors, or other accelerator devices described herein. The memory chiplets 2075 can be DRAM (e.g., GDDR, HBM) memory or cache (SRAM) memory. Cache memory 2092 within the silicon interposer 2089 (or substrate 2080) can act as a global cache for the package assembly 2090, part of a distributed global cache, or as a dedicated cache for the fabric 2085.

Each chiplet can be fabricated as separate semiconductor die and coupled with a base die that is embedded within or coupled with the substrate 2080. The coupling with the substrate 2080 can be performed via an interconnect structure 2073. The interconnect structure 2073 may be configured to route electrical signals between the various chiplets and logic within the substrate 2080. The interconnect structure 2073 can include interconnects such as, but not limited to bumps or pillars. In some embodiments, the interconnect structure 2073 may be configured to route electrical signals such as, for example, input/output (I/O) signals and/or power or ground signals associated with the operation of the logic, I/O and memory chiplets. In one embodiment, an additional interconnect structure couples the silicon interposer 2089 with the substrate 2080.

In some embodiments, the substrate 2080 is an epoxy-based laminate substrate. The substrate 2080 may include other suitable types of substrates in other embodiments. The package assembly 2090 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, a logic or I/O chiplet 2074 and a memory chiplet 2075 can be electrically coupled via a bridge 2087 that is configured to route electrical signals between the logic or I/O chiplet 2074 and a memory chiplet 2075. The bridge 2087 may be a dense interconnect structure that provides a route for electrical signals. The bridge 2087 may include a bridge substrate composed of glass or a suitable semiconductor material. Electrical routing features can be formed on the bridge substrate to provide a chip-to-chip connection between the logic or I/O chiplet 2074 and a memory chiplet 2075. The bridge 2087 may also be referred to as a silicon bridge or an interconnect bridge. For example, the bridge 2087, in some embodiments, is an Embedded Multi-die Interconnect Bridge (EMIB). In some embodiments, the bridge 2087 may simply be a direct connection from one chiplet to another chiplet.

Figure 20D:
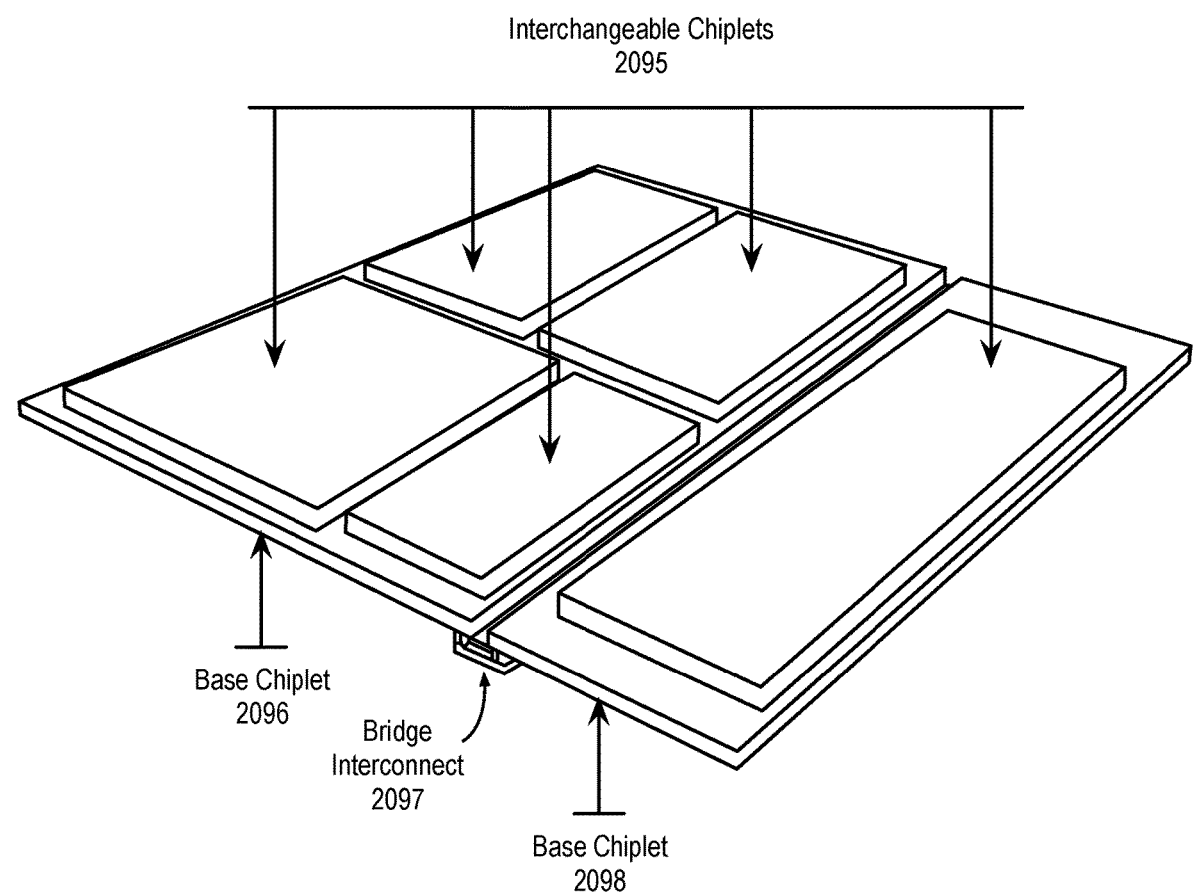

FIG. 20D illustrates a package assembly 2094 including interchangeable chiplets 2095, according to an embodiment. The interchangeable chiplets 2095 can be assembled into standardized slots on one or more base chiplets 2096, 2098. The base chiplets 2096, 2098 can be coupled via a bridge interconnect 2097, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 2096, 2098, which can be fabricated using a different process technology relative to the interchangeable chiplets 2095 that are stacked on top of the base chiplets. For example, the base chiplets 2096, 2098 can be fabricated using a larger process technology, while the interchangeable chiplets 2095 can be manufactured using a smaller process technology. One or more of the interchangeable chiplets 2095 may be memory (e.g., DRAM) chiplets. Different memory densities can be selected for the package assembly 2094 based on the power, and/or performance targeted for the product that uses the package assembly 2094. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Figure 21:
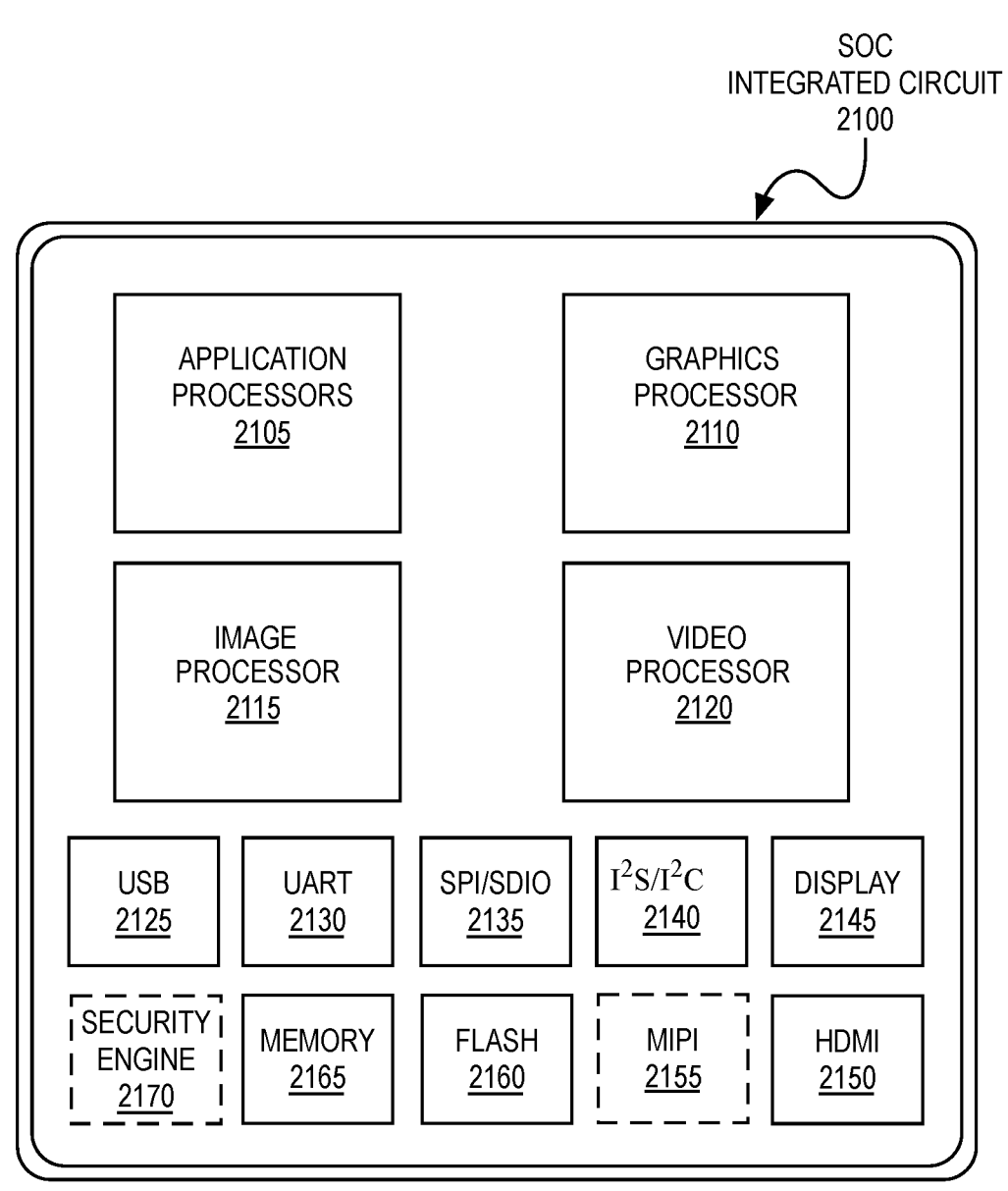
FIG. 21 illustrates an exemplary integrated circuit and associated processors that may be fabricated using one or more IP cores, according to various embodiments described herein.

FIG. 21 illustrates an exemplary integrated circuit and associated processors that may be fabricated using one or more IP cores, according to various embodiments described herein. In addition to what is illustrated, other logic and circuits may be included, including additional graphics processors/cores, peripheral interface controllers, or general-purpose processor cores. As shown in FIG. 21, an integrated circuit 2100 can include one or more application processors 2105 (e.g., CPUs), at least one graphics processor 2110, and may additionally include an image processor 2115 and/or a video processor 2120, any of which may be a modular IP core from the same or multiple different design facilities. Integrated circuit 2100 includes peripheral or bus logic including a USB controller 2125, UART controller 2130, an SPI/SDIO controller 2135, and an I²S/I²C controller 2140. Additionally, the integrated circuit can include a display device 2145 coupled to one or more of a high-definition multimedia interface (HDMI) controller 2150 and a mobile industry processor interface (MIPI) display interface 2155. Storage may be provided by a flash memory subsystem 2160 including flash memory and a flash memory controller. Memory interface may be provided via a memory controller 2165 for access to SDRAM or SRAM memory devices. Some integrated circuits additionally include an embedded security engine 2170.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A processor comprising:
first circuitry to decode an instruction, the instruction to indicate a first source operand, a second source operand, a third source operand and a destination operand; and
second circuitry to perform operations corresponding to the instruction, including to:
perform an element-wise multiply on 52-bit data values in corresponding 64-bit data elements of the second source operand and the third source operand to generate a set of 104-bit intermediate products; and
when the instruction has a first opcode:
zero-extend high 52 bits of the set of 104-bit intermediate products to first 64-bit values;
perform an arithmetic operation on the first 64-bit values and second 64-bit values within 64-bit data elements of the first source operand to generate 64-bit intermediate values;
zero-extend low 52 bits of the 64-bit intermediate values to generate 64-bit result values; and
store the 64-bit result values in the destination operand;
wherein the second circuitry is further to:
when the instruction has a different opcode:
perform an arithmetic operation on the high 52 bits of the 104-bit intermediate products and low 52 bits of the 64-bit data elements of the first source operand to generate 52-bit or 53-bit intermediate values;
zero-extend the 52-bit or 53-bit intermediate values to generate 64-bit data values; and
store the 64-bit data values in the destination operand.

2. The processor as in claim 1, wherein the arithmetic operation to be performed when the instruction has the first opcode is an addition operation and the first opcode is associated with a 52-bit multiply-add instruction.

3. The processor as in claim 1, wherein the arithmetic operation to be performed when the instruction has the first opcode is a subtraction operation and the first opcode is associated with a 52-bit multiply-subtract instruction.

4. The processor as in claim 1, wherein the intermediate values to be generated by the arithmetic operation when the instruction has the different opcode are the 53-bit intermediate values that include a 52-bit intermediate value and an overflow bit, the arithmetic operation to be performed when the instruction has the different opcode is an addition operation, and the different opcode is associated with a 52-bit multiply-add instruction.

5. The processor as in claim 1, wherein the intermediate values to be generated by the arithmetic operation when the instruction has the different opcode are the 52-bit intermediate values and the second circuitry is to set a bit in a mask in response to a determination that one or more of the intermediate values exceeds 52-bits, wherein the arithmetic operation to be performed when the instruction has the different opcode is a subtraction operation and the different opcode is associated with a 52-bit multiply-subtract instruction or the arithmetic operation to be performed when the instruction has the different opcode is an addition operation and the different opcode is associated with a 52-bit multiply-add instruction.

6. The processor as in claim 1, wherein the processor is a general-purpose processing unit or a general-purpose graphics processing unit.

7. A method comprising:

fetching and decoding an instruction, the instruction having multiple source operands and one or more destination operands; and performing operations corresponding to the instruction, including:

performing an element-wise multiply on 52-bit data values in corresponding 64-bit data elements of two of the multiple source operands to generate a set of 104-bit intermediate products;

zero-extending high 52 bits of the set of 104-bit intermediate products to generate 64-bit result values when the instruction has a first opcode;

zero-extending low 52 bits of the set of 104-bit intermediate products to generate the 64-bit result values when the instruction has a different opcode than the first opcode; and packing the 64-bit result values into a packed data type and storing the packed data type in the one or more destination operands, wherein performing the operations corresponding to the instruction additionally includes, when the instruction has a third opcode:

zero-extending the high 52 bits of the 104-bit intermediate products to generate first 64-bit intermediate values;

adding to or subtracting from the first 64-bit intermediate values using 64-bit data elements of an additional source operand of the multiple source operands to generate second 64-bit intermediate values; and zero-extending the low 52 bits of the second 64-bit intermediate values to the 64-bit result values before packing the 64-bit result values into the packed data type.

8. The method as in claim 7, wherein performing the operations corresponding to the instruction additionally includes:

when the instruction has a fourth opcode:

adding to or subtracting from the high 52 bits of the 104-bit intermediate products and the low 52 bits of the 64-bit data elements of an additional source operand of the multiple source operands to generate intermediate values, wherein the intermediate values are 52-bit or 53-bit intermediate values; and zero-extending the intermediate values to generate the 64-bit result values before packing the 64-bit result values into the packed data type.

9. A processor comprising:

first circuitry to decode a first instruction and a second instruction, the first instruction to indicate a first source operand, a second source operand, a third source operand and a first destination operand, the second instruction to indicate a fourth source operand, a fifth source operand, a sixth source operand and a second destination operand; and second circuitry to perform operations corresponding to the first instruction, including to:

perform an element-wise multiply on 52-bit data values in corresponding 64-bit data elements of the second source operand and the third source operand to generate a first set of 104-bit intermediate products;

zero-extend high 52 bits of the first set of 104-bit intermediate products to first 64-bit values;

perform an arithmetic operation on the first 64-bit values and second 64-bit values within 64-bit data elements of the first source operand to generate 64-bit intermediate values;

zero-extend low 52 bits of the 64-bit intermediate values to generate 64-bit result values; and store the 64-bit result values in the first destination operand, wherein the second circuitry is further to perform operations corresponding to the second instruction, including to:

perform an element-wise multiply on 52-bit data values in corresponding 64-bit data elements of the fifth source operand and the sixth source operand to generate a second set of 104-bit intermediate products;

perform an arithmetic operation on high 52 bits of the second set of 104-bit intermediate products and low 52 bits of 64-bit data elements of the fourth source operand to generate 52-bit or 53-bit intermediate values;

zero-extend the 52-bit or 53-bit intermediate values to generate second 64-bit result values; and store the second 64-bit result values in the second destination operand.

\* \* \* \* \*